(12) United States Patent
Nishi et al.

(10) Patent No.: US 11,842,562 B2
(45) Date of Patent: Dec. 12, 2023

(54) INFORMATION PROCESSING APPARATUS AND INFORMATION PROCESSING METHOD

(71) Applicant: SONY GROUP CORPORATION, Tokyo (JP)

(72) Inventors: Ayaka Nishi, Kanagawa (JP); Koichi Sakumoto, Tokyo (JP); Naoko Kobayashi, Tokyo (JP); Atsushi Negishi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/634,400

(22) PCT Filed: Sep. 7, 2020

(86) PCT No.: PCT/JP2020/033789
§ 371 (c)(1),
(2) Date: Feb. 10, 2022

(87) PCT Pub. No.: WO2021/054177
PCT Pub. Date: Mar. 25, 2021

(65) Prior Publication Data
US 2022/0327860 A1    Oct. 13, 2022

(30) Foreign Application Priority Data

Sep. 18, 2019  (JP) ................................. 2019-169094

(51) Int. Cl.
*G06V 40/12*     (2022.01)
*G06V 40/13*     (2022.01)

(52) U.S. Cl.
CPC ...... *G06V 40/1353* (2022.01); *G06V 40/1318* (2022.01); *G06V 40/1371* (2022.01)

(58) Field of Classification Search
CPC ........... G06V 40/1353; G06V 40/1318; G06V 40/1371; G06T 1/00; G06T 7/00; G06F 21/32; G06F 21/45; G06F 21/6227
See application file for complete search history.

(56) References Cited

U.S. PATENT DOCUMENTS

| | | | |
|---|---|---|---|
| 2015/0235098 A1* | 8/2015 | Lee ........................ | G06V 40/13 715/709 |
| 2017/0063851 A1* | 3/2017 | Kim .................... | H04W 12/065 |
| 2018/0373917 A1* | 12/2018 | Sheik-Nainar ..... | G06V 40/1347 |

FOREIGN PATENT DOCUMENTS

| | | |
|---|---|---|
| JP | 2004-021615 A | 1/2004 |
| JP | 2009-098826 A | 5/2009 |
| JP | 2017-522624 A | 8/2017 |

(Continued)

*Primary Examiner* — Premal R Patel
(74) *Attorney, Agent, or Firm* — Paratus Law Group, PLLC

(57) ABSTRACT

There is provided an information processing apparatus and an information processing method capable of improving security against leakage of a registered fingerprint in fingerprint authentication. Collation is performed on the basis of whether or not a feature amount of a partial region of an entire fingerprint imaged by a fingerprint imaging unit and a method of operation on the fingerprint imaging unit match the feature amount of the partial region of the entire fingerprint and the method of operation registered in advance. Application to a fingerprint authentication device is possible.

20 Claims, 23 Drawing Sheets

(56) References Cited

FOREIGN PATENT DOCUMENTS

WO  WO 2005/114438 A1  12/2005
WO  WO 2018/079001 A1  5/2018

* cited by examiner

INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2020/033789 (filed on Sep. 7, 2020) under 35 U.S.C. § 371, which claims priority to Japanese Patent Application No. 2019-169094 (filed on Sep. 18, 2019), which are all hereby incorporated by reference in their entirety.

TECHNICAL FIELD

The present disclosure relates to an information processing apparatus and an information processing method, and more particularly, to an information processing apparatus and an information processing method capable of improving security against leakage of a registered fingerprint in fingerprint authentication.

BACKGROUND ART

One of authentication approaches using biological information is a fingerprint authentication technology using a fingerprint.

In fingerprint authentication, after an entire fingerprint has been registered, a user performing the authentication presents a fingerprint of the user, the registered fingerprint and the presented fingerprint are collated, and the user's identity is authenticated if the registered fingerprint and the presented fingerprint match each other.

Incidentally, as can be said for not only fingerprint authentication but also all kinds of authentication processing using biological information, since biological information is used for registration and collation, in a case where, for example, the biological information has been leaked for some reason, the biological information cannot be changed, and there has been a possibility that this allows for continuous unauthorized use of the authentication.

Thus, a technology has been proposed in which the entire fingerprint is registered, and an inclination of the registered fingerprint and upper, lower, left, and right parts are used for authentication (see Patent Document 1).

CITATION LIST

Patent Document

Patent Document 1: WO 2018/079001 A

SUMMARY OF THE INVENTION

Problems to be Solved by the Invention

However, the technology described in Patent Document 1 uses only a part of the fingerprint, and in a case where information of the entire fingerprint has been leaked, a part of the leaked information is used, and it has not been possible to ensure security related to authentication.

The present disclosure has been made in view of such a situation, and particularly, an object of the present disclosure is to improve security against leakage of a registered fingerprint in fingerprint authentication.

Solutions to Problems

A first aspect of the present disclosure provides an information processing apparatus including a registration unit that registers feature amounts of partial regions of an entire fingerprint used at time of collation in association with a method of presenting the fingerprint in the partial regions of the entire fingerprint at the time of collation.

The first aspect of the present disclosure provides an information processing method including the step of registering feature amounts of partial regions of an entire fingerprint used at time of collation in association with a method of presenting the fingerprint in the partial regions of the entire fingerprint at the time of collation.

In the first aspect of the present disclosure, the feature amounts of the partial regions of the entire fingerprint used at the time of collation are registered in association with the method of presenting the fingerprint in the partial regions of the entire fingerprint at the time of collation.

A second aspect of the present disclosure provides an information processing apparatus including a collation unit that performs collation on the basis of whether or not feature amounts of partial regions of an entire fingerprint and a method of presenting the fingerprint in the partial regions of the entire fingerprint match the feature amounts of the partial regions of the entire fingerprint and the method of presentation registered in advance.

The second aspect of the present disclosure provides an information processing method including the step of performing collation on the basis of whether or not feature amounts of partial regions of an entire fingerprint and a method of presenting the fingerprint in the partial regions of the entire fingerprint match the feature amounts of the partial regions of the entire fingerprint and the method of presentation registered in advance.

In the second aspect of the present disclosure, collation is performed on the basis of whether or not the feature amounts of the partial regions of the entire fingerprint and the method of presenting the fingerprint in the partial regions of the entire fingerprint match the feature amounts of the partial regions of the entire fingerprint and the method of presentation registered advance.

MODE FOR CARRYING OUT THE INVENTION

Figure 1:
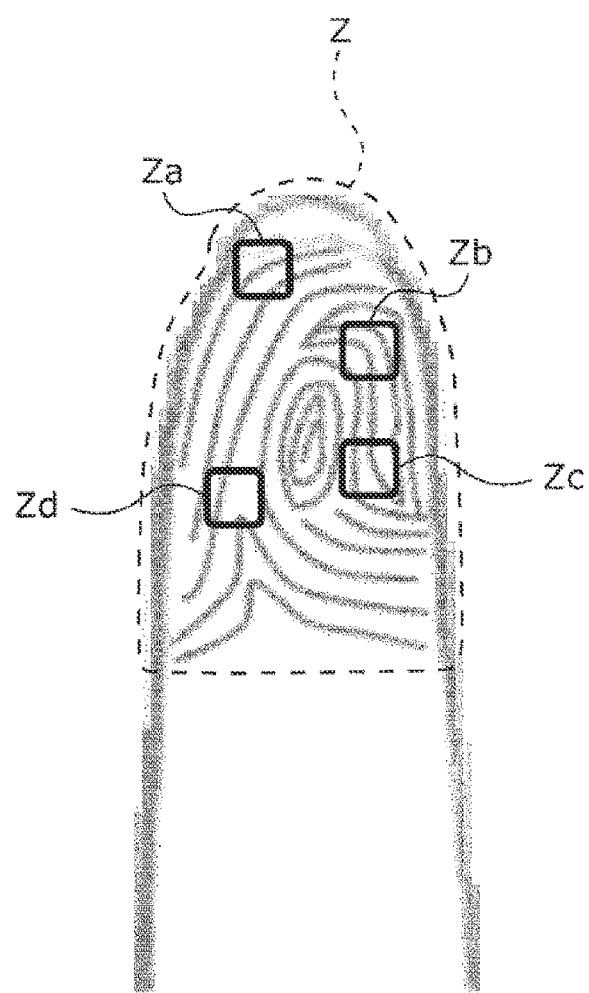
FIG. 1 is a diagram illustrating an outline of the present disclosure.

Preferred embodiments of the present disclosure will be described below in detail with reference to the accompanying drawings. Note that, in the present specification and drawings, components having substantially the same functional configurations are denoted by the same reference numerals, and the description thereof will thus not be repeated.

Modes for carrying out the present technology will be described below. The description will be made in the order below.

1. Outline of present disclosure
2. First embodiment
3. Second embodiment
4. First modified example
5. Second modified example
6. Application example
7. Example of execution by software

1. Outline of Present Disclosure

The present disclosure is to improve security against leakage of fingerprint information in fingerprint authentication.

First, an outline of the present disclosure will be described.

In general fingerprint authentication, first, a user registers a fingerprint at the time of registration. Then, when the user presents the fingerprint at the time of collation, the presented fingerprint and the registered fingerprint are collated. The authentication of the user succeeds if the presented fingerprint and the registered fingerprint match, and the authentication fails if they do not match.

However, there has been a possibility that, in a case where fingerprint information of the user is leaked, authentication by a third party using the leaked fingerprint becomes possible, and moreover, the user himself or herself cannot change the fingerprint, which makes it practically impossible for the user to perform authentication using the fingerprint of the user.

Thus, in the present disclosure, as illustrated in FIG. 1, in general, feature amounts obtained from partial regions Za to Zd are registered for a region Z of the entire fingerprint to be registered, and a method of use (specific rule) at the time of collation of the feature amounts obtained from the partial regions Za to Zd is also registered.

Then, at the time of collation, collation determination is performed on the basis of whether or not the feature amounts obtained from the regions Za to Zd are feature amounts acquired in accordance with the specific use method (specific rule) registered in advance, and each of the acquired feature amounts matches the corresponding feature amount registered in advance.

Here, the specific use method (specific rule) is information that defines how the acquired feature amounts are to be used at the time of collation.

In other words, in a case where a plurality of feature amounts can be acquired from a plurality of partial regions, the information defines how the plurality of feature amounts is to be combined and used.

For example, as illustrated in FIG. 1, since the feature amounts obtained from the partial regions Za to Zd in the region Z of the entire fingerprint are different from each other, an order in which the feature amounts are acquired is specified for definition of the use method.

That is, in a case where the feature amounts obtained from the partial regions Za to Zd are feature amounts extracted from a fingerprint image captured when each of the partial regions Za, Zb, Zc, and Zd is tapped against an imaging surface having a fingerprint imaging function, for example, an order in which the feature amounts obtained from the regions Za to Zd are acquired is defined as the method of using the feature amounts.

Consideration will be given to a case where, for example, the order in which the feature amounts obtained from the partial regions Za to Zd are acquired is defined as being in the order of the regions Za, Zb, Zc, and Zd as the method of using the feature amounts.

In a case where the method of using the feature amounts has been defined as described above, in collation processing, the collation processing is performed on the basis of whether the feature amounts acquired from the regions Za, Zb, Zc, and Zd are feature amounts acquired in the order of the regions Za, Zb, Zc, and Zd, and each of the acquired feature amounts matches the corresponding feature amount registered in advance, and then authentication processing is performed on the basis of the collation result.

Furthermore, a variety of methods of using the feature amounts can be set. For example, a method may be defined in which, in a state where a finger is in contact with a surface having a fingerprint imaging function, the feature amounts are sequentially acquired when the finger is slid while changing a partial region to be a contacting surface.

By such processing, in the case of the fingerprint in FIG. 1, it is possible to limit the fingerprint information to be registered (information regarding the feature amounts obtained from the partial regions of the fingerprint) to only the feature amounts obtained from the partial regions Za, Zb, Zc, and Zd. Thus, even in a case where information regarding the feature amounts related to the fingerprint in the partial regions Za, Zb, Zc, and Zd is leaked, it is possible to ensure security by changing the order of acquiring the feature amounts as a method of use at the time of collation of the feature amounts obtained from the regions Za to Zd.

Furthermore, by changing positions of the regions Za, Zb, Zc, and Zd in the region Z of the entire fingerprint in FIG. 1, it is also possible to ensure security without changing the method of use at the time of collation of the feature amounts obtained from the regions Za to Zd.

Moreover, by changing the positions of the regions Za, Zb, Zc, and Zd and then changing the method of use at the time of collation of the feature amounts obtained from the regions Za to Zd, it is possible to more firmly ensure security.

That is, as described above, the feature amounts obtained from the fingerprint to be registered are set to be feature amounts obtained from the plurality of partial regions, and moreover, the method of using the feature amounts obtained from the plurality of partial regions is also registered. Thus, at the time of collation, collation can be performed on the basis of whether or not the feature amounts obtained from the partial regions have been acquired by the registered use method and match the registered feature amounts.

As a result, it is possible to ensure security against leakage of fingerprint information (information regarding feature amounts obtained from a fingerprint) while ensuring security related to authentication.

Note that the method of using the feature amounts described above defines the method of using the plurality of feature amounts obtained from the plurality of partial regions of the entire fingerprint in the collation processing. For example, in a case where the order in which the feature amounts of the corresponding regions are acquired is defined as the method of use, from a viewpoint of a user, it can be understood as a presentation method in which the order in which the partial regions of the entire fingerprint are presented is defined so that the defined method of using the feature amounts is implemented, and it can also be understood as an operation method for implementing the presentation method.

That is, in the present disclosure, at the time of registration, the feature amounts extracted from the partial regions of the entire fingerprint related to the fingerprint authentication and the method of using, presenting, or operating the feature amounts extracted from the partial regions at the of collation are registered in association with each other.

Furthermore, at the time of collation, collation is performed on the basis of whether or not the acquired feature amounts are registered feature amounts and are feature amounts defined by a use method, a presentation method, or an operation method registered in association with the feature amounts, and then authentication processing is performed on the basis of a result of the collation.

As a result, it is possible to ensure security against leakage of fingerprint information (information regarding feature amounts obtained from a fingerprint) while ensuring security related to authentication.

2. First Embodiment

<Configuration Example of Smartphone of Present Disclosure>

Next, a configuration example of an external appearance of a smartphone of the present disclosure will be described with reference to FIG. 2.

Figure 2:
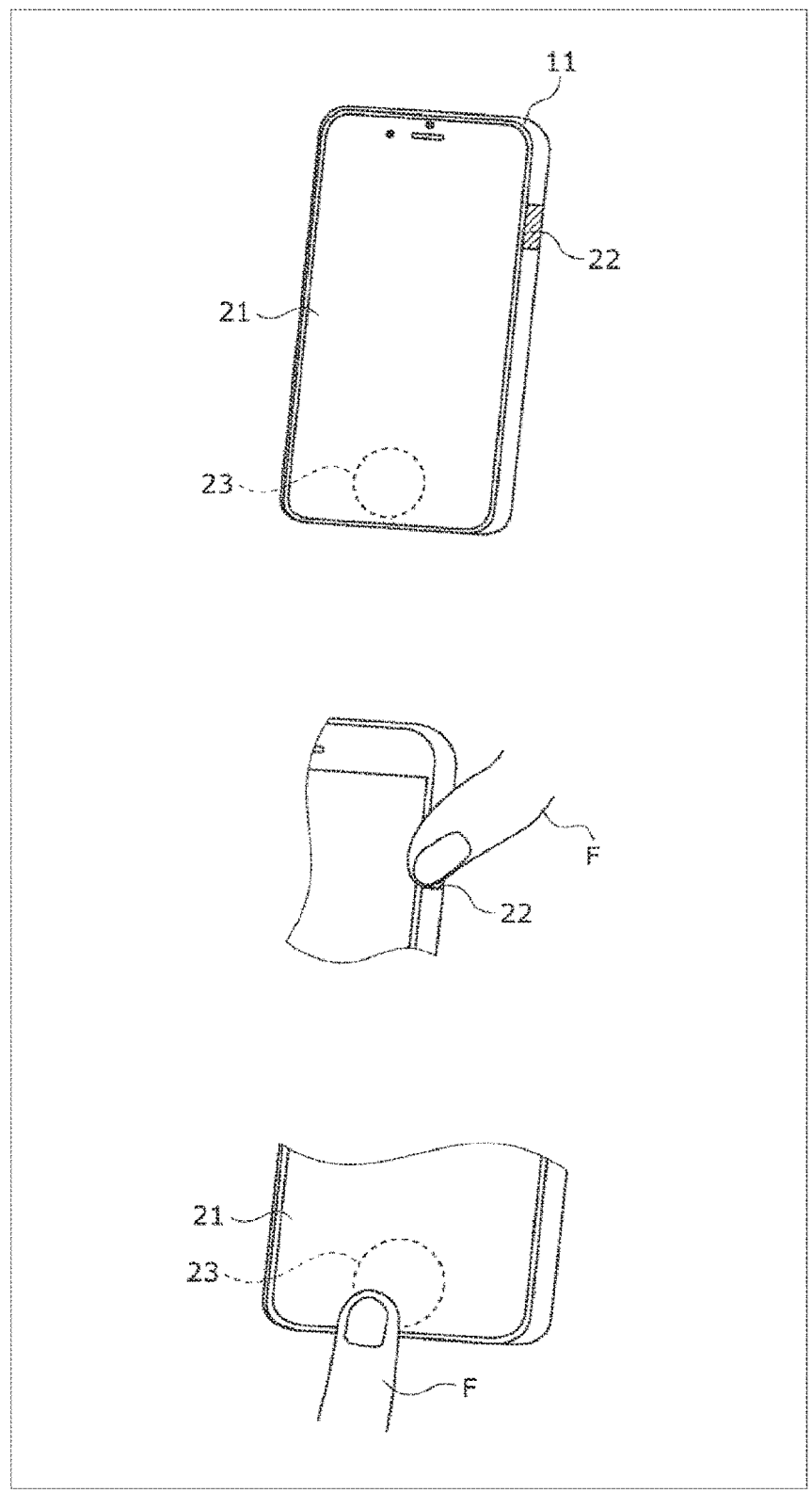
FIG. 2 is an external view of a smartphone of the present disclosure.

Note that, in FIG. 2, an upper part illustrates an external view of a smartphone 11 of the present disclosure, a middle part illustrates an external view when a user presents a fingerprint by bringing a ball of a finger F (a surface on the finger with the fingerprint) into contact with a fingerprint imaging unit 22 provided on a side surface portion of the smartphone 11 of the present disclosure, and a lower part illustrates an external view when the user presents the fingerprint by bringing the ball of the finger F into contact with a fingerprint imaging unit 23 embedded in a display unit 21.

That is, as illustrated in the upper part of FIG. 2, the smartphone 11 of the present disclosure is a so-called portable communication terminal that is portable and has a communication function.

The smartphone 11 is provided with the display unit 21 constituted by a liquid crystal display (LCD) or an organic electro-luminescence (EL) on a surface thereof, and displays various processing results.

Furthermore, the display unit 21 is also configured as a touch panel to function also as an operation unit that accepts a user's operation.

Figure 3:
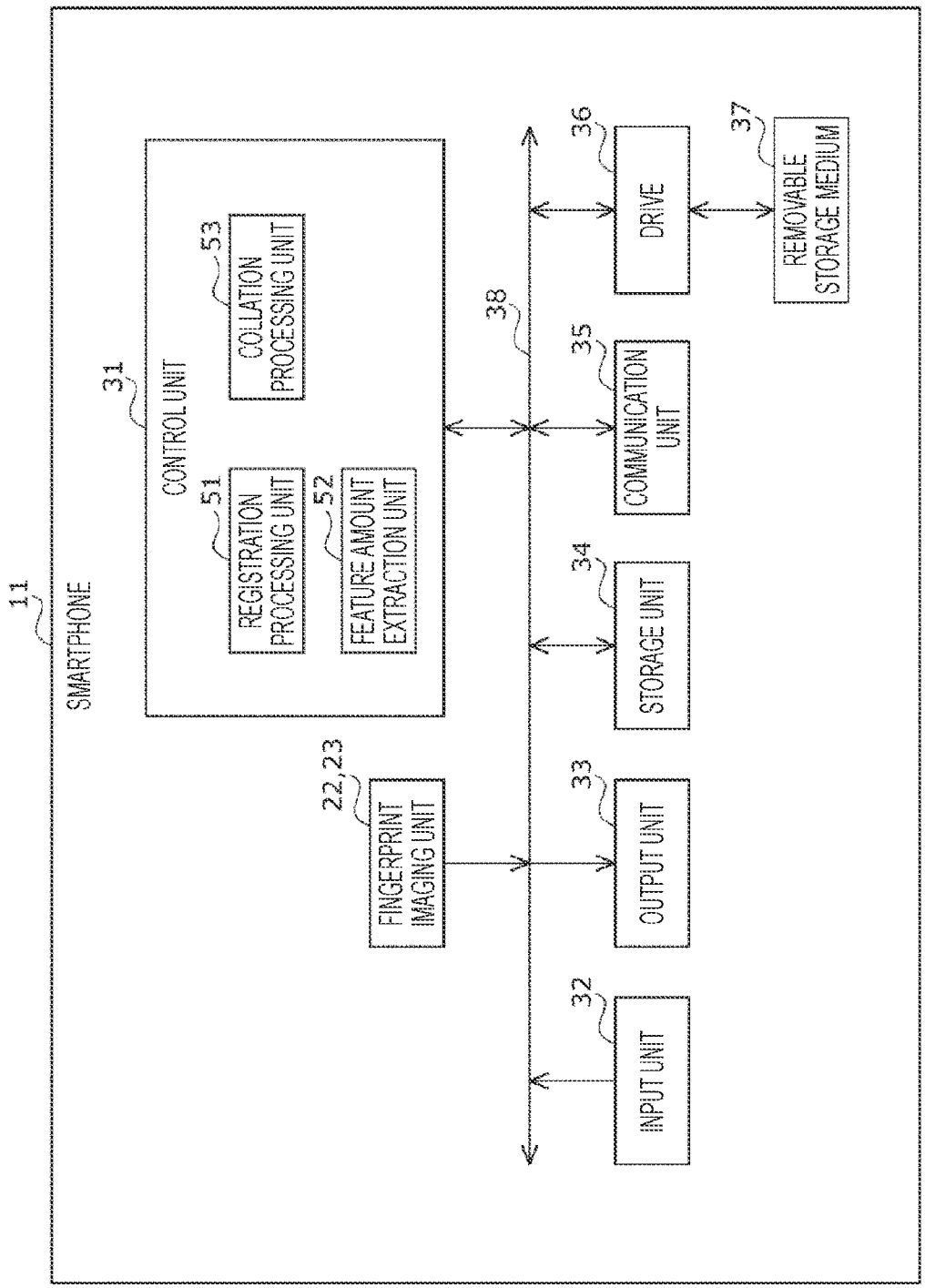
FIG. 3 is a diagram illustrating a configuration example of hardware of the smartphone of the present disclosure.

The fingerprint imaging unit 22 is provided on the side surface portion of the smartphone 11. For example, when the fingerprint on the surface of the finger is imaged in a state where the ball of the finger F such as a thumb or another finger of the user is in contact with the fingerprint imaging unit 22 as illustrated in the middle part of FIG. 2, presentation of the fingerprint is accepted, and a result of the imaging is output to a control unit 31 (FIG. 3).

The fingerprint imaging unit 22 has, for example, a size of about 3 mm×3 mm, and can only image a partial region of the entire fingerprint by one contact of the finger.

Furthermore, at a lower portion of the display unit 21 in the drawing, as indicated by a dotted line, the fingerprint imaging unit 23 is embedded under a panel of the display unit 21. When the fingerprint on the surface of the finger is imaged in a state where the finger F such as a thumb or another finger is in contact with the fingerprint imaging unit 23 as illustrated in the lower part of FIG. 2, presentation of the fingerprint is accepted, and a result of the imaging is output to the control unit 31 (FIG. 3).

The fingerprint imaging unit 23 may have, for example, about the same size as the fingerprint imaging unit 22, or may have a range larger than a thumb as illustrated in FIG. 2 so that the entire fingerprint can be imaged with one contact.

The smartphone 11 of the present disclosure presents, on the display unit 21, an image for prompting the user to perform various operations in registration processing and collation processing of information necessary for fingerprint authentication, and processing results, and executes the registration processing and the collation processing on the basis of a fingerprint image captured when the finger is brought into contact with the fingerprint imaging unit 22 or 23.

Note that, although the smartphone 11 in FIG. 1 shows an example in which the fingerprint imaging units 22 and 23 are provided, it is sufficient if any one of them is provided.

<Configuration Example of Hardware of Smartphone in FIG. 2>

Next, a configuration example of hardware of the smartphone in FIG. 2 will be described with reference to a block diagram in FIG. 3.

The smartphone 11 in FIG. 3 includes the fingerprint imaging units 22 and 23 (at least either the fingerprint imaging unit 22 or the fingerprint imaging unit 23), the control unit 31, an input unit 32, an output unit 33, a storage unit 34, a communication unit 35, a drive 36, and a removable storage medium 37, which are connected to each other via a bus 38 so that data and programs can be transmitted and received.

The control unit 31 includes a processor and a memory, and controls an entire operation of the smartphone 11.

Furthermore, the control unit 31 includes a registration processing unit 51, a feature amount extraction unit 52, and a collation processing unit 53.

The registration processing unit 51 executes processing of registering feature amounts obtained from partial regions of an entire fingerprint of a user in association with an operation method in accordance with a method of use at the time of collation of the feature amounts.

That is, the registration processing unit 51 causes the display unit 21 to display an image prompting registration of the feature amounts of the entire fingerprint or the partial regions of the entire fingerprint and registration of the operation method in accordance with the method of using the feature amounts at the time of collation, and acquires information regarding the use method designated by an operation on the touch panel of the display unit 21 on the basis of the image.

Note that the information prompting the user to perform registration by bringing a part of the fingerprint of the corresponding finger into contact with the fingerprint imaging unit 22 or 23 may be presented by a method other than displaying the information as an image on the display unit 21 or the like. For example, information prompting by voice may be presented.

Moreover, the registration processing unit 51 controls the feature amount extraction unit 52 to extract the feature amounts on the basis of a fingerprint image captured by the fingerprint imaging unit 22 or 23.

Then, the registration processing unit 51 stores, in the storage unit 34, the feature amounts obtained from the partial regions of the acquired fingerprint in association with the operation method in accordance with the method of use at the time of collation of the feature amounts obtained from the partial regions of the fingerprint.

The feature amount extraction unit 52 is controlled by the registration processing unit 51 and the collation processing unit 53, and extracts the feature amounts on the basis of a fingerprint image captured by the fingerprint imaging unit 22 or 23.

Here, the feature amounts are, for example, information of characteristic regions such as a branch portion and an end portion of the fingerprint called minutiae obtained from a fingerprint image, or information of a pattern of the fingerprint itself.

The collation processing unit 53 executes collation processing based on feature amounts obtained from a plurality of partial regions of a fingerprint of a user and the method of use at the time of collation of the feature amounts.

More specifically, the collation processing unit 53 displays, on the display unit 21, an image prompting the user to present a part of the entire fingerprint for collation by bringing the part of the entire fingerprint into contact with the fingerprint imaging unit 22 or 23.

Note that the information prompting the user to present a part of the fingerprint of the finger necessary for collation by bringing the finger into contact with the fingerprint imaging unit 22 or 23 may be presented by a method other than displaying the information as an image on the display unit 21 or the like. For example, information prompting by voice may be presented.

Furthermore, the collation processing unit 53 controls the feature amount extraction unit 52 on the basis of a fingerprint image captured by the fingerprint imaging unit 22 or 23 to extract the feature amounts.

Then, the collation processing unit 53 determines success or failure of the authentication on the basis of whether or not the feature amounts obtained from a plurality of partial regions of the acquired fingerprint and the method of use at the time of collation of the feature amounts obtained from the partial regions of the fingerprint match those registered in the storage unit 34 in advance.

The input unit 32 is constituted by an input device such as a key with which a user inputs an operation command, and supplies various input signals to the control unit 31. In the case of the smartphone 11 in FIG. 2, since the display unit 21 is constituted by a touch panel, the display unit 21 also functions as the input unit 32. Furthermore, the input unit 32 may be, for example, a microphone for inputting voice, and in this case, the input unit 32 constituted by a microphone collects voice and outputs the voice to the control unit 31 as voice data.

The output unit 33 is controlled by the control unit 31, and outputs a supplied operation screen or an image of a processing result to the display unit 21 or the like for display. Furthermore, the output unit 33 may be constituted by a speaker (not illustrated) for outputting voice, may be constituted by a light emitting unit (not illustrated) for emitting light in a predetermined color or at a predetermined interval, or may be constituted by a vibrator (not illustrated) for generating vibration in a predetermined rhythm or at a predetermined interval.

The storage unit 34 is constituted by a hard disk drive (HDD), a solid state drive (SSD), a semiconductor memory, or the like, and is controlled by the control unit 31 to write or read various types of data and programs including content data.

The communication unit 35 is controlled by the control unit 31 to transmit and receive various types of data or programs to and from various devices via a communication network represented by a local area network (LAN) or the like in a wired (or wireless (not illustrated)) manner.

The drive 36 reads and writes data from and to the removable storage medium 37 such as a magnetic disc (including a flexible disc), as optical disc (including a compact disc-read only memory (CD-ROM) and a digital versatile disc (DVD)), a magneto-optical disc (including Mini Disc (MD)), or a semiconductor memory.

<Examples of Operation Method in Accordance With Method of use at Time of Collation of Feature Amounts Obtained from Partial Regions of Entire Fingerprint>

As an operation method in accordance with the method of use at the time of collation of the feature amounts obtained from the partial regions of the entire fingerprint, there are several methods. For example, in a case where there are four partial regions in the entire fingerprint, the operation method may be such that the fingerprint imaging unit 22 or 23 is tapped with each of regions Za1, Zb1, Zc1, and Zd1 set as indicated by an arrow from above in the drawing in the region Z of the entire fingerprint as illustrated in FIG. 4.

Figure 4:
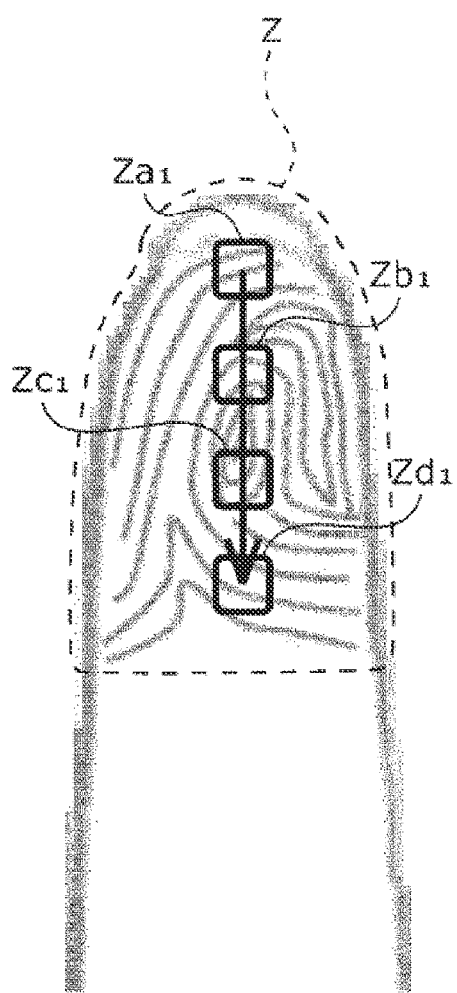
FIG. 4 is a diagram illustrating a first example of an operation method in accordance with a method of use at the time of collation of a feature amount obtained from a partial region of a fingerprint.

In the case of FIG. 4, the user taps once with each of the positions of the regions Za1, Zb1, Zc1, and Zd1, four times in total, while moving the finger in the direction of a downward arrow in the drawing with the ball of the finger facing the fingerprint imaging unit 22 or 23.

When the fingerprint imaging unit 22 or 23 is tapped with each of the positions of the regions Za1, Zb1, Zc1, and Zd1 of the finger, the fingerprint imaging unit 22 or 23 sequentially captures fingerprint images and outputs the fingerprint images to the collation processing unit 53 of the control unit 31.

The collation processing unit 53 sequentially supplies the fingerprint images supplied from the fingerprint imaging unit 22 or 23 to the feature amount extraction unit 52 for extraction of the feature amounts, and determines success or failure of the authentication on the basis of a collation result as to whether or not the extracted feature amounts have been acquired in the order of the regions Za1, Zb1, Zc1, and Zd1 associated with the registered operation method, and each of the feature amounts matches the corresponding registered feature amount.

Note that the case of FIG. 4 is based on an assumption that the registration processing unit 51 has registered in advance, in the storage unit 34, the feature amounts extracted from the fingerprint images captured when the fingerprint imaging unit 22 or 23 is tapped in the order of the regions Za1, Zb1, Zc1, and Zd1 in association with information regarding the operation method including information regarding the order related to the extraction.

Figure 5:
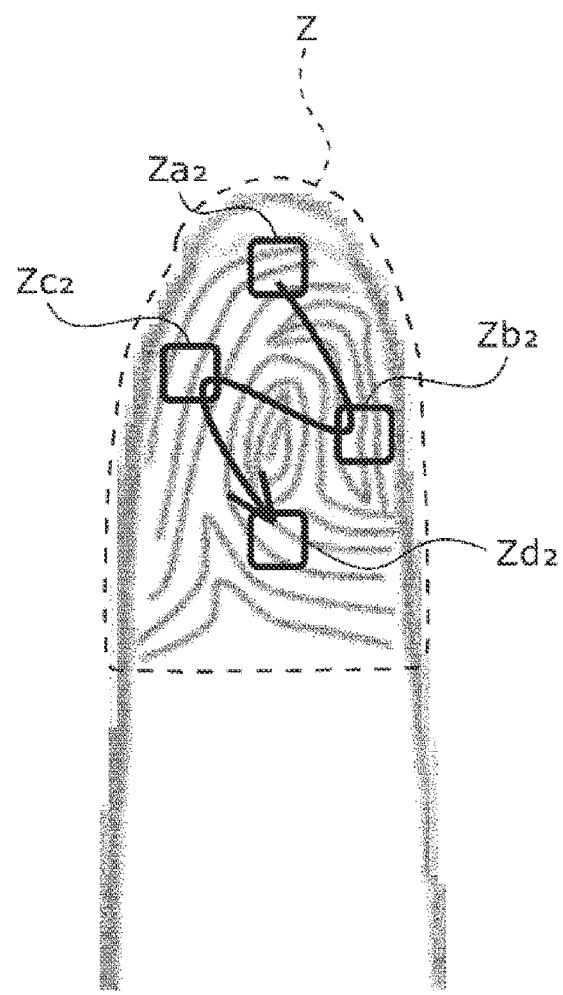
FIG. 5 is a diagram illustrating a second example of the operation method in accordance with a method of use at the time of collation of a feature amount obtained from a partial region of the fingerprint.

Furthermore, an operation method may be adopted in which the fingerprint imaging unit 22 or 23 is tapped with each of regions Za2, Zb2, Zc2, and Zd2 set as indicated by an S-shaped arrow from the top in the drawing in the region Z of the entire fingerprint as illustrated in FIG. 5.

In the case of FIG. 5, the user taps once with each of the positions of the regions Za2, Zb2, Zc2, and Zd2, four times in total, while moving the finger in the direction of the S-shaped arrow in the drawing with the ball of the finger facing the fingerprint imaging unit 22 or 23.

When the fingerprint imaging unit 22 or 23 is tapped with each of the positions of the regions Za2, Zb2, Zc2, and Zd2 of the finger, the fingerprint imaging unit 22 or 23 sequentially captures fingerprint images and outputs the fingerprint images to the collation processing unit 53 of the control unit 31.

The collation processing unit 53 sequentially supplies the fingerprint images supplied from the fingerprint imaging unit 22 or 23 to the feature amount extraction unit 52 for extraction of the feature amounts, and determines the success or failure of the authentication on the basis of a collation result as to whether or not the extracted feature amounts have been acquired in the order of the regions Za2, Zb2, Zc2, and Zd2 associated with the registered operation method, and each of the feature amounts matches the corresponding registered feature amount.

Note that the case of FIG. 5 is based on an assumption that the registration processing unit 51 has registered in advance, in the storage unit 34, the feature amounts extracted from the fingerprint images captured when the fingerprint imaging unit 22 or 23 is tapped in the order of the regions Za2, Zb2, Zc2, and Zd2 in association with information regarding the operation method including information regarding the order related to the extraction.

Figure 6:
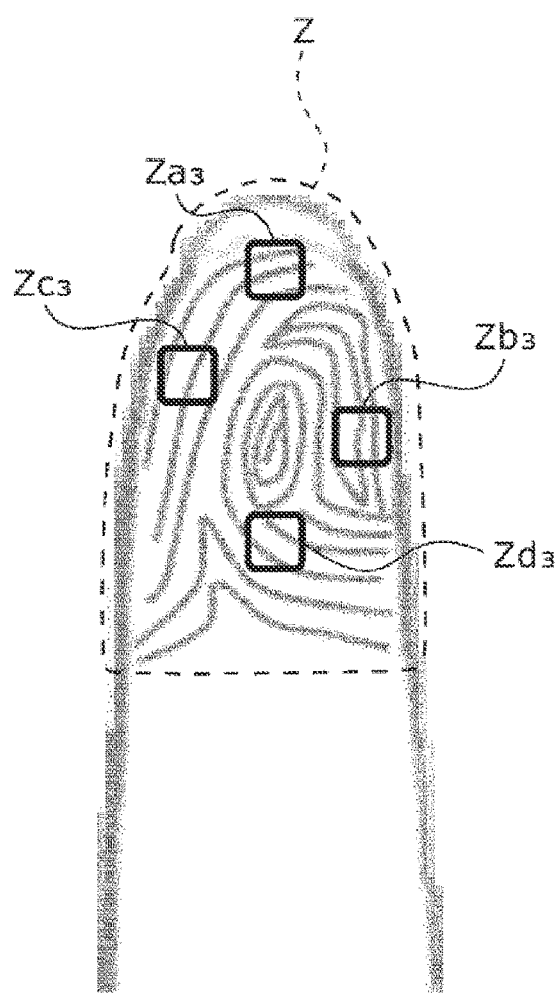
FIG. 6 is a diagram illustrating a third example of the operation method in accordance with a method of use at the time of collation of a feature amount obtained from a partial region of the fingerprint.

Furthermore, an operation method may be adopted in which, as illustrated in FIG. 6, the fingerprint imaging unit 22 or 23 is tapped with each of regions Za3, Zb3, Zc3, and Zd3 in any order, the regions being set in the drawing in the region Z of the entire fingerprint.

In the case of FIG. 6, the user taps with the finger on the fingerprint imaging unit 22 or 23, once with each of the positions of the regions Za3, Zb3, Zc3, and Zd3, four times in total, is any order.

When the fingerprint imaging unit 22 or 23 is tapped with each of the positions of the regions Za3, Zb3, Zc3, and Zd3 of the finger, the fingerprint imaging unit 22 or 23 sequentially captures fingerprint images and outputs the fingerprint images to the collation processing unit 53 of the control unit 31.

The collation processing unit 53 sequentially supplies the fingerprint images supplied from the fingerprint imaging unit 22 or 23 to the feature amount extraction unit 52 for extraction of the feature amounts, and determines the success or failure of the authentication on the basis of a collation result as to whether or not all the extracted feature amounts have been acquired regardless of the order of the regions Za3, Zb3, Zc3, and Zd3, and each of the feature amounts matches the corresponding registered feature amount.

Note that the case of FIG. 6 is based on an assumption that the registration processing unit 51 has registered in advance, in the storage unit 34, operation information in which all the feature amounts are acquired regardless of the order of the regions Za3, Zb3, Zc3, and Zd3 in association with the corresponding feature amounts.

Figure 7:
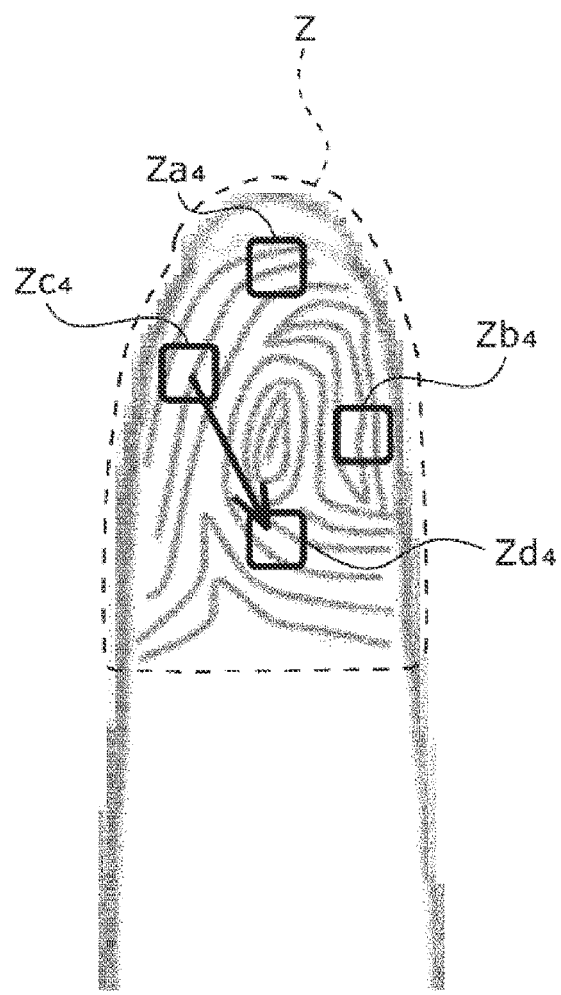
FIG. 7 is a diagram illustrating a fourth example of the operation method in accordance with a method of use at the time of collation of a feature amount obtained from a partial region of the fingerprint.

Moreover, an operation method may be adopted in which, as illustrated in FIG. 7, as for feature amounts obtained when the fingerprint imaging unit 22 or 23 is tapped with each of regions Za4, Zb4, Zc4, and Zd4 set in the drawing in the region Z of the entire fingerprint, tapping is performed such that the feature amounts obtained from the regions Za4 and Zb4 may be detected in any order, but the feature amounts obtained from the regions Zc4 and Zd4 are successively detected in the order of the regions Zc4 and Zd4.

In the case of FIG. 7, the user taps with the finger against the fingerprint imaging unit 22 or 23 in any order for the feature amounts of the regions Za4 and Zb4, and successively for the regions Zc4 and Zd4 in this order, four times in total.

When the fingerprint imaging unit 22 or 23 is tapped with each of the positions of the regions Za4, Zb4, Zc4, and Zd4 of the finger, the fingerprint imaging unit 22 or 23 sequentially captures fingerprint images and outputs the fingerprint images to the collation processing unit 53 of the control unit 31.

The collation processing unit 53 sequentially supplies the fingerprint images supplied from the fingerprint imaging unit 22 or 23 to the feature amount extraction unit 52 for extraction of the feature amounts, and determines the success or failure of the authentication on the basis of whether or not the extracted feature amounts have been detected in any order for the feature amounts of the regions Za4 and Zb4, and have been acquired successively for the feature amounts of the regions Zc4 and Zd4 in this order, and each of the feature amounts matches the corresponding registered feature amount.

Note that the case of FIG. 7 is based on an assumption that the registration processing unit 51 has registered in advance, in the storage unit 34, operation information in which the feature amounts of the regions Za4 and Zb4 are detected in any order, and the feature amounts of the regions Zc4 and Zd4 are acquired successively and in this order, in association with the corresponding feature amounts.

Incidentally, as described above, the operation method in accordance with the method of using the feature amounts of the plurality of partial regions of the entire fingerprint is information to be memorized by the user.

It is therefore possible to consider that the registered information necessary for collation in the present disclosure is a combination of the feature amounts of the partial regions of the entire fingerprint and the presentation method or the operation method in accordance with the method of using the feature amounts memorized by the user.

Since the information necessary for collation is a combination of the feature amounts of the partial regions of the entire fingerprint and the information to be memorized by the user as described above, only a part of the entire fingerprint is required as the information registered for collation. Therefore, even in a case where information of a partial region of the registered entire fingerprint has been leaked, it is possible to take a countermeasure for the leaked information and improve security against information leakage by performing at least either processing of changing and re-registering a partial region of the entire fingerprint, or processing of changing the presentation method or the operation method in accordance with the method of using the feature amounts of the partial regions.

Furthermore, as for registration of the fingerprint, it is also possible to register the entire fingerprint, and perform collation on the basis of the feature amounts obtained from the partial regions to be used and the operation method.

That is, as described above, in the present disclosure, the registered information necessary for collation is a combination of the feature amounts of the partial regions of the entire fingerprint and the presentation method or the operation method memorized by the user.

Thus, even in a case where the feature amounts obtained from the regions of the entire fingerprint have been leaked, unauthorized use of the authentication is not possible in a case where which partial regions of the entire fingerprint are to be presented and the operation method of presenting the feature amounts at the time of collation have not been leaked.

Furthermore, even in a case where the entire fingerprint has been leaked as described above, it is possible to take a countermeasure against information leakage by performing at least either changing the feature amounts of the partial regions of the entire fingerprint used at the time of collation, or changing the presentation method or the operation method in accordance with the method of using the acquired feature amounts.

<Example of Method of Registering Operation Method in Accordance With Method of using Feature Amounts of Partial Regions of Entire Fingerprint>

Next, an example of a method of registering the operation method in accordance with the method of using the feature amounts of the partial regions of the entire fingerprint will be described with reference to FIGS. 8 to 10.

At the time of registration, the registration processing unit 51 displays an outer shape FP of the entire fingerprint on the display unit 21, for example, to present information prompting designation of a partial region to be registered.

Figure 8:
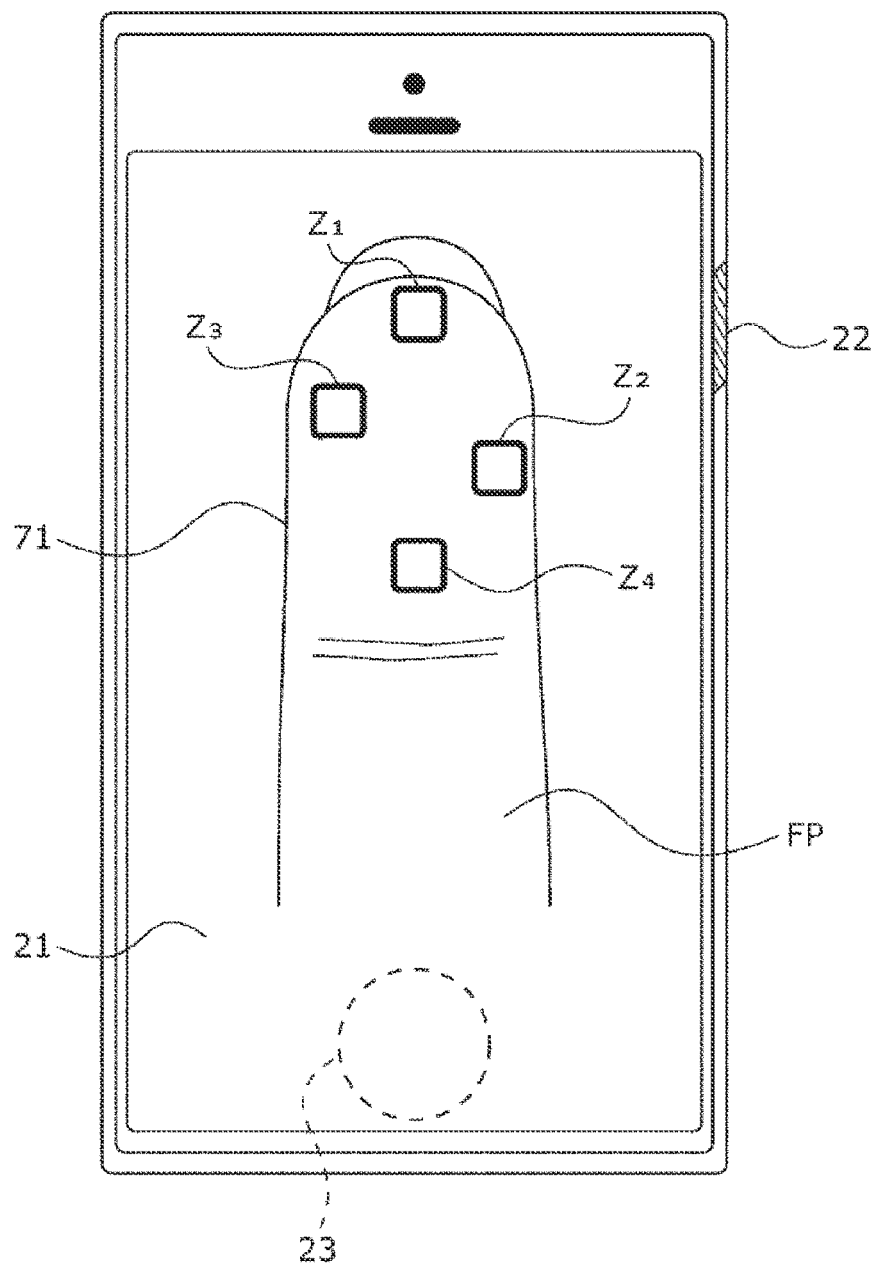
FIG. 8 is a diagram illustrating a method of registering an operation method in accordance with a method of using a feature amount of a partial region of the entire fingerprint.

With this presentation, for example, as illustrated in FIG. 8, four rectangular regions Z1, Z2, Z3, and Z4 are designated by the user as partial regions of the entire fingerprint to be registered on the outer shape FP of the entire fingerprint displayed on the display unit 21.

The positions of the rectangular regions Z1, Z2, Z3, and Z4 on the display unit 21 can be freely moved by being touched by the user as long as the positions are on the outer shape FP of the entire fingerprint. Thus, the user can designate any position as a partial region of the entire fingerprint to be registered.

Furthermore, in FIG. 8, the four rectangular regions Z1, Z2, Z3, and Z4 are registered, but the number of the partial regions of the entire fingerprint may not be four, and may be any number equal to or more than one.

That is, since information in which the feature amounts of the partial regions and the presentation method or the operation method are combined is collated with the registered information, the number of partial regions used for collation may be one. That is, since which partial regions of the entire fingerprint are used for collation is information to be memorized by the user, even in a case where there is only one partial region used for collation, unauthorized use of the authentication by a third party is not possible unless the third party knows the partial region used for collation.

Moreover, the same position may be registered as a plurality of positions. For example, in a case where the same partial region has been designated as four partial regions, the fingerprint imaging unit 22 or 23 may be tapped four times with the same partial region at the time of collation. Furthermore, for example, for the four portions, tapping may be performed with two portions, two times each with the same portion.

Moreover, as illustrated in FIG. 8, when the positions of partial regions are designated, the registration processing unit 51 displays an image or outputs voice prompting designation of the order of tapping. Furthermore, the registration processing unit 51 may emit light in a different color or generate vibration with a vibrator to prompt designation of the order of tapping.

Figure 9:
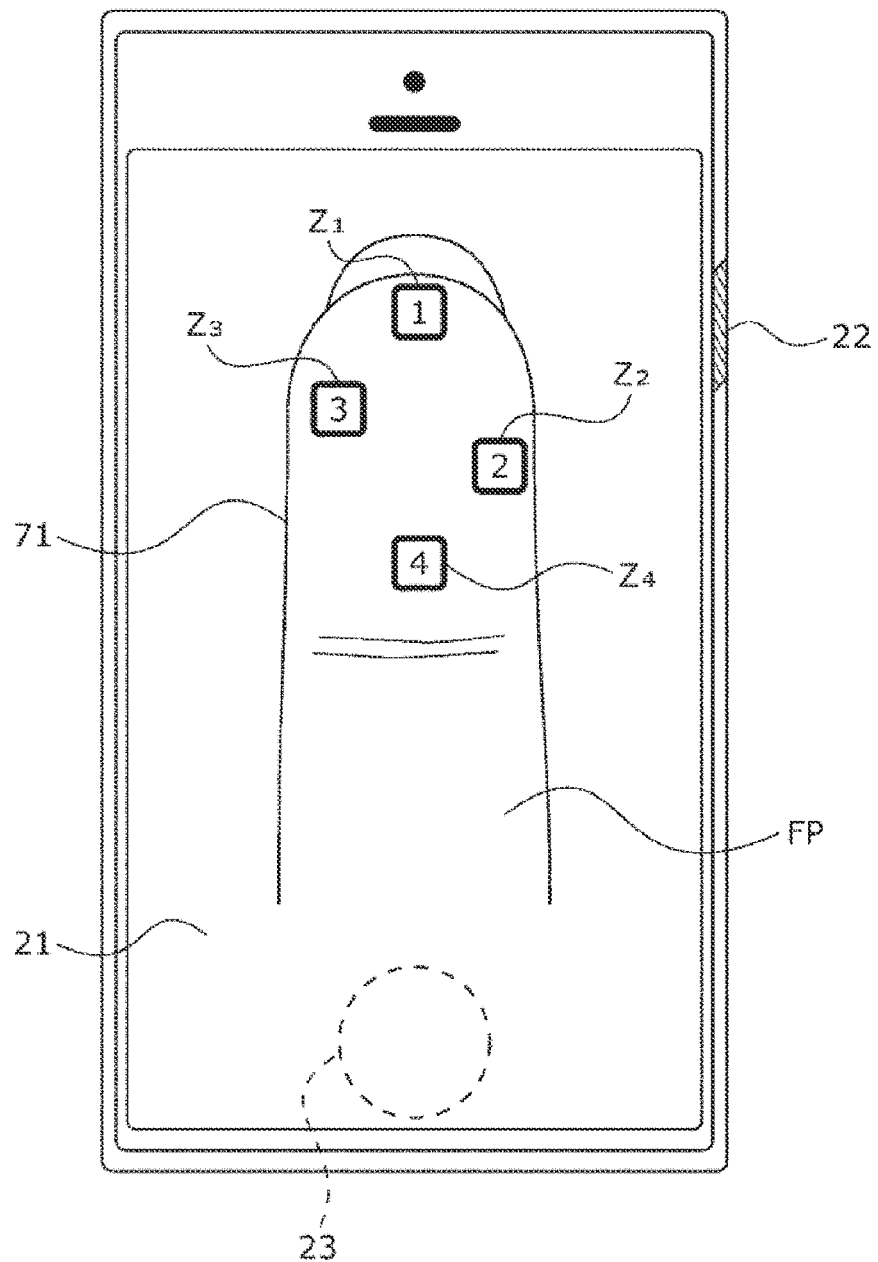
FIG. 9 is a diagram illustrating the method of registering the operation method in accordance with the method of using the feature amount of the partial region of the entire fingerprint.

With this arrangement, for example, when the user operates the touch panel of the display unit 21 to input numbers or the like in the rectangular regions Z1, Z2, Z3, and Z4, the numbers or the like are displayed as information indicating the order as illustrated in FIG. 9.

With the display as illustrated in FIG. 8, the user can set positions while recognizing the positions of the partial regions of the entire fingerprint that the user intends to register.

Furthermore, on the display unit 21 in FIG. 9, a state is displayed in which "1" is input inside a frame of the region Z1, "2" is input inside a frame of the region Z2, "3" is input inside a frame of the region Z3, and "4" is input inside a frame of the region Z4 on the outer shape FP of the entire fingerprint.

That is, FIG. 9 illustrates that the user has registered an operation method in which the finger is tapped against the fingerprint imaging unit 22 or 23 in the order of the regions Z1, Z2, Z3, and Z4.

With the display as illustrated in FIG. 9, the user can set the order of tapping while recognizing each of the positions of the partial regions of the entire fingerprint that the user intends to register.

Moreover, the registration processing unit 51 displays an image or outputs voice prompting registration of the feature amounts of the partial regions of the fingerprint.

Figure 10:
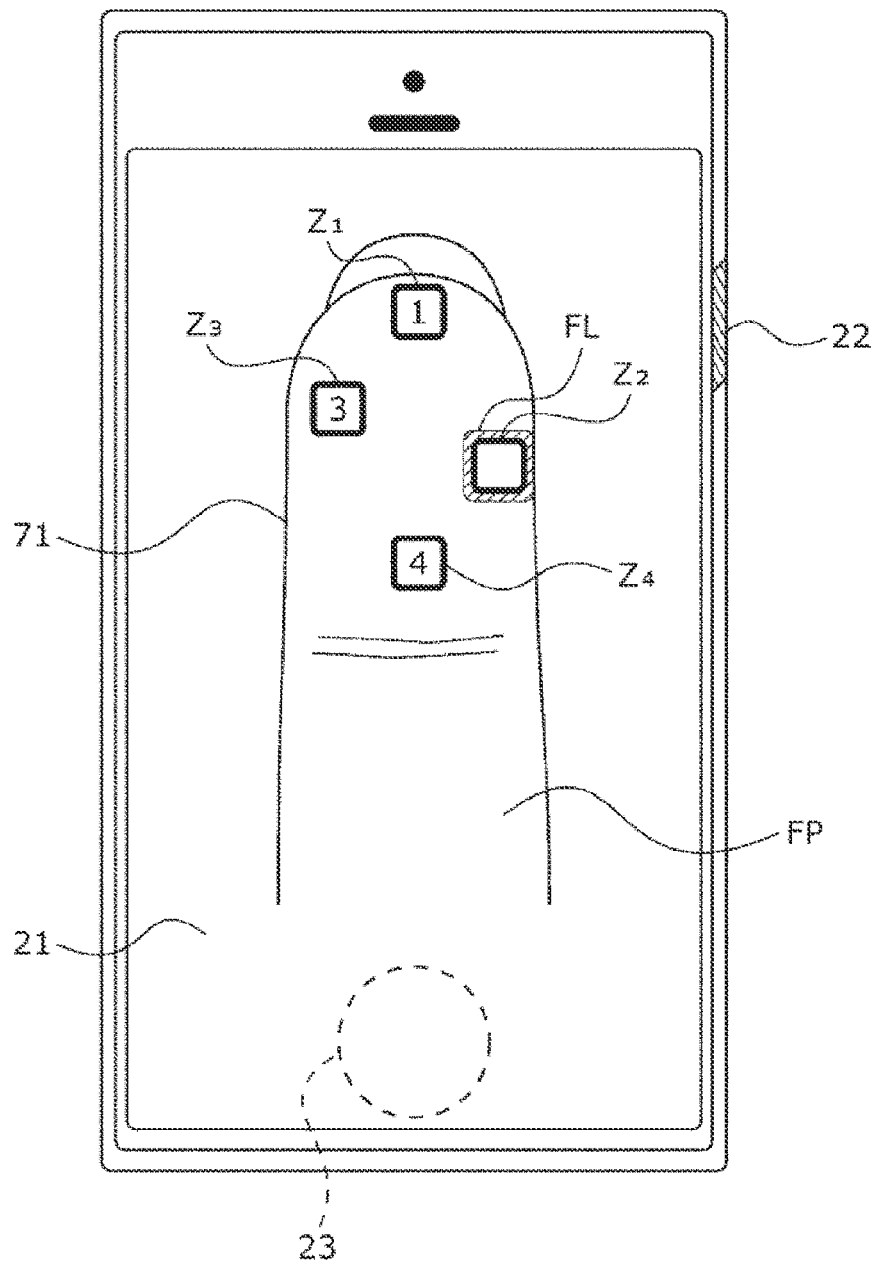
FIG. 10 is a diagram illustrating the method of registering the operation method in accordance with the method of using the feature amount of the partial region of the entire fingerprint.

At this time, as illustrated in FIG. 10, for specification of the positions of the partial regions for which registration is to be prompted, the registration processing unit 51 may, for example, cause any unregistered region among the rectangular regions Z1, Z2, Z3, and Z4 to emit light in the region or display the region with a thick frame to facilitate recognition of the position, thereby prompting registration.

FIG. 10 illustrates an example in which the region Z2 is displayed with a thick frame FL.

That is, with the display as illustrated in FIG. 10, it is possible to allow the user to recognize that the user is prompted to register the ordinal number of the feature amount of the partial region for the region Z2.

Furthermore, while recognizing which regions are the partial regions of the entire fingerprint that the user intends to register, the user can bring the fingerprint into contact with the fingerprint imaging unit 22 or 23 so that the fingerprint is imaged at an appropriate position and registered as the feature amount.

At this time, a region that has been registered may be displayed is a different color so that it can be visually recognized that the registration has been completed, or voice may be output or vibration may be generated by a vibrator at a timing when the registration has been completed.

By the registration processing based on a series of display images described with reference to FIGS. 8 to 10, while visually checking the positions of the partial regions of the entire fingerprint that the user intends to register and the order of tapping each of the regions, the user can register the feature amounts of the partial regions of the entire fingerprint and the operation method.

Note that the example described above shows a case where the smartphone 11 according to the embodiment of the present disclosure has a configuration such as the display unit 21. Alternatively, in a case where the device does not include the display unit 21 but includes only the fingerprint imaging unit 22 or 23, the series of registration processing described above may be implemented only by voice.

For example, as for the positions of the partial regions, any of positions that are fixed to some extent such as a central portion, an upper center portion, a lower center portion, an upper right portion, a right lateral portion, a lower right portion, an upper left portion, a left lateral portion, and a lower left portion of the finger may be read aloud, and at that timing, the corresponding partial region may be brought into contact with the fingerprint imaging unit 22 or 23 for registration.

Furthermore, at this time, the order can be registered by voice recognition in which, for example, "First, the central portion, second, the upper right portion, third, the lower left portion, and fourth, the left lateral portion." is uttered by voice input or the like, and then a microphone (not illustrated) collects this voice.

<Specific Example of Feature Amounts Obtained from Partial Regions of Entire Fingerprint and Method of Registering Operation Method in Accordance With Method of Use>

Next, a specific example of feature amounts obtained from partial regions of the entire fingerprint and a method of registering an operation method in accordance with a method of using the feature amounts will be described with reference to FIG. 11.

Figure 11:
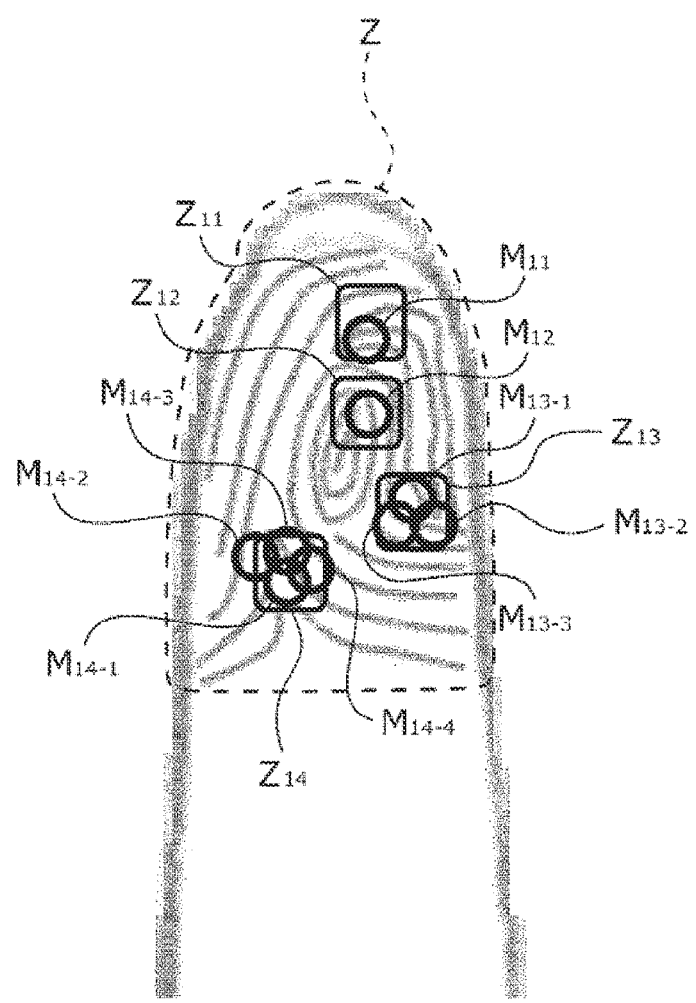
FIG. 11 is a diagram illustrating a specific example of a feature amount obtained from a partial region of the entire fingerprint and the method of registering the operation method in accordance with the method of using the feature amount.

Consideration be given to a case where, for example, regions Z11 to Z14 are set as partial regions of the region Z of the entire fingerprint as illustrated in FIG. 11, and an operation method in accordance with a method of use in which the feature amounts obtained from the regions Z11 to Z14 are used in the order of the regions Z11, Z12, Z13, and Z14 is specified.

Here, it is assumed that the feature amount extraction unit 52 extracts the number of minutiae as a feature amount, and registers the extracted feature amount as a feature amount of the corresponding region.

On the assumption that circles in the drawing indicate positions at which minutiae have been detected, a minutiae M11 has been detected in the region Z11 in FIG. 11, a minutia M12 has been detected in the region Z12, minutiae M13-1 to M13-3 have been detected in the region Z13, and minutiae M14-1 to M14-4 have been detected in the region Z14.

In this case, the feature amount extraction unit 52 registers the feature amount of the region Z11 as 1, the feature amount of the region Z12 as 1, the feature amount of the region Z13 as and the feature amount of the region Z14 as 4.

Therefore, in this case, the registration processing unit 51 registers the feature amount of the region Z11 as 1, the feature amount of the region Z12 as 1, the feature amount of the region Z13 as 3, and the feature amount of the region Z14 as 4, and registers the order of detecting the feature amounts as the operation method in accordance with the method of using the feature amounts when the feature amounts are, detected in the order of 1, 1, 3, and 4.

Note that minutiae are not feature amounts detected in every region of the entire fingerprint, and in a case where no minutia has been detected, it may be registered that no minutia is to be detected. That is, it is possible to use, as a feature amount, no detection of minutiae.

Furthermore, a feature amount may be other than a minutia, and, for example, a fingerprint pattern itself may be used as a feature amount.

Moreover, a minutia and a fingerprint pattern may be used in combination as a feature amount.

Furthermore, in a case where a fingerprint pattern is used as a feature amount, accuracy of collation is high, but a load related to the collation processing is high. Thus, the fingerprint pattern may be used as the feature amount depending on the region only in a case where no minutia is detected.

Note that, here, the description has been given on an assumption that only the feature amounts of the partial regions of the entire fingerprint are registered. Alternatively, the feature amounts of the entire fingerprint may be registered. In such a case, it is sufficient if it is possible to specify, as a use method, which of the feature amounts of the registered partial regions are used and the order in which the feature amounts are used.

Furthermore, in a case where the area of contact with the finger is small as in the fingerprint imaging unit 22, there is a possibility that the user cannot appropriately bring the partial region of the registered finger into contact at the time of collation, and the collation result is "unmatched".

As a countermeasure against such a case, at the time of registration, information of the entire fingerprint may be acquired by the fingerprint imaging unit 23 or the like, and a minutia detected for each partial region may be individually registered.

That is, in general, minutiae can be individually identified because, in the case of minutiae, some of characteristic points in the shape of the fingerprint are extracted, and a positional relationship between the points, the number of ridges or the like between the points, and the like are used as feature amounts.

Thus, at the time of registration processing, the region Z11 in FIG. 11 is registered in a state where the minutia M11 can be individually identified as a feature amount. Similarly, the region Z12 is registered in a state where the minutia M12 can be individually identified as a feature amount, the region Z13 is registered in a state where the minutiae M13-1 to M13-3 can be individually identified as feature amounts, and the region Z14 is registered in a state where each of the minutiae M14-1 to M14-4 can be individually identified as feature amounts.

By the registration as described above, as for the region Z13, when any of the minutiae M13-1 to M13-3 is detected among the detected feature amounts, it is recognized that tapping has been performed. Similarly, as for the region Z14, when any of the minutiae M14-1 to M14-4 is detected among the detected feature amounts, it is recognized that tapping has been performed.

Thus, in a case where the minutiae as the feature amounts have been individually registered in association with the corresponding regions Z11 to Z14 as described above, the success or failure of the authentication is determined on the basis of whether or not the regions specified on the basis of the feature amounts belonging to the corresponding regions have been tapped in the registered order, instead of the number of feature amounts detected when each region is tapped.

Figure 12:
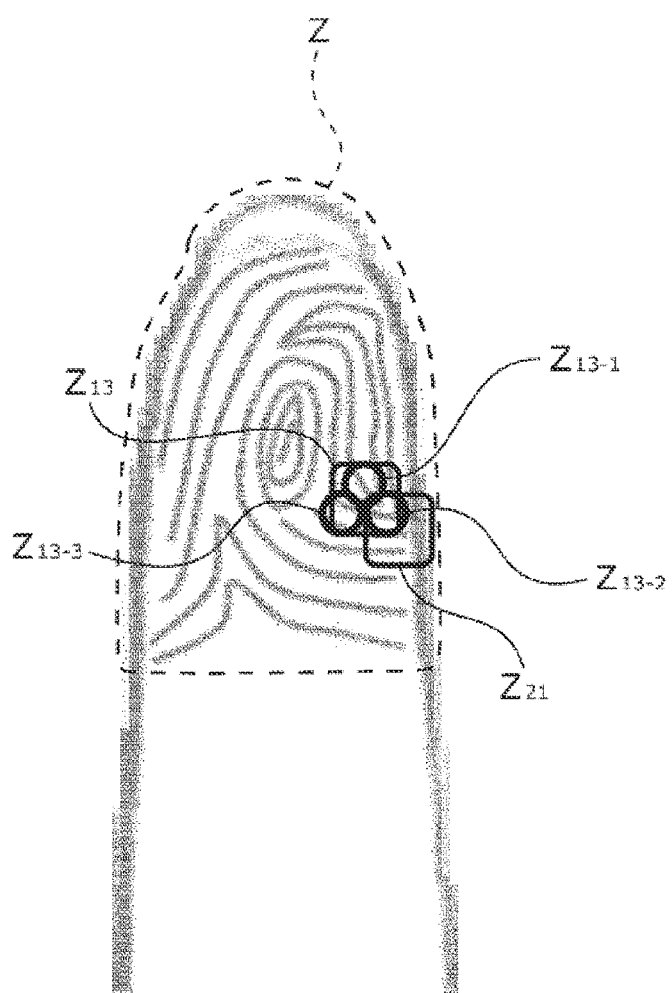
FIG. 12 is a diagram illustrating a specific example of a feature amount obtained from a partial region of the entire fingerprint and the method of registering the operation method in accordance with the method of using the feature amount.

More specifically, for example, as illustrated in FIG. 12, there can be a case in which the use cannot appropriately bring the region Z13 as a part of the registered finger into contact with the fingerprint imaging unit 22 at the time of collation, but a region Z21 is brought into contact.

In such a case, although the three minutiae M13-1 to M13-3 should have been detected if the region Z13 had been brought into contact, only one minutia, the minutia M13-2, is detected.

However, in a case where the minutiae to be detected have been individually registered for the corresponding partial regions of the entire fingerprint, even in a state where the region Z21 is in contact with the fingerprint imaging unit 22 as illustrated in FIG. 12, the minutia M13-2, which is the detected feature amount, is recognized as being one of the minutiae M13-1 to M13-3 to be detected in the region Z13.

With this arrangement, it is possible cc specify that the region where the minutia M13-2 is detected is the region Z13. Thus, even in a case where the region Z21, in which the feature amount has been acquired for any ordinal number, has been brought into contact with the fingerprint imaging unit 22, it is possible to specify that the region Z13 has been brought into contact.

Note that, in the example describe above, information of the entire fingerprint is acquired, and the detected minutiae are individually registered for the corresponding partial regions of the entire fingerprint. However, for example, in a case where the partial region Z13 including the minutiae M13-1 to M13-3 or the partial region Z14 including the minutiae M14-1 to M14-4 is imaged, similar countermeasures can be taken. That is, as long as a partial region including a plurality of minutiae is imaged as described above, it is not always necessary to acquire information of the entire fingerprint.

<Registration Processing>

Figure 13:
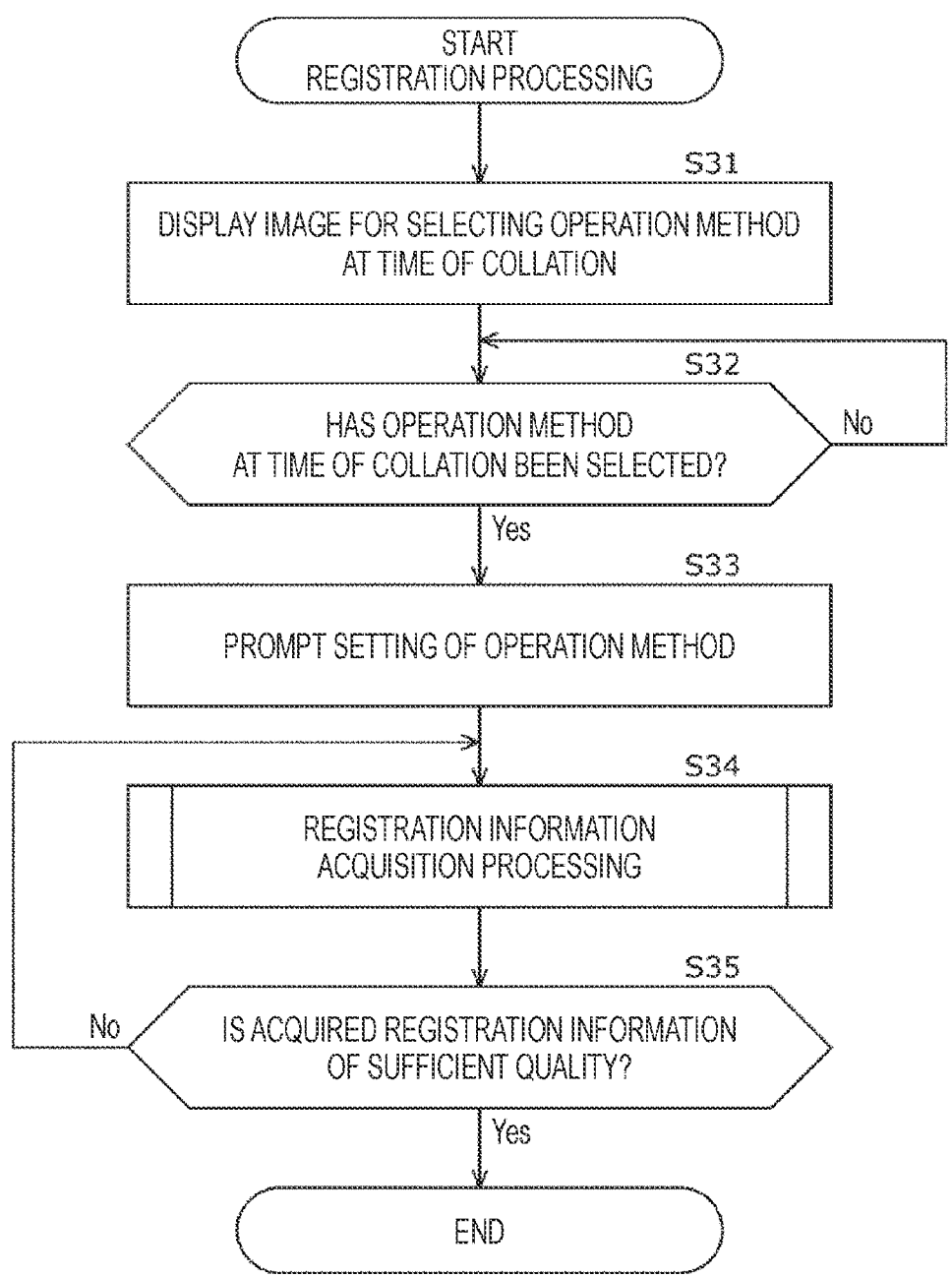
FIG. 13 is a flowchart illustrating registration processing.

Next, the registration processing will be described with reference to a flowchart in FIG. 13.

In step S31, the registration processing unit 51 generates an image that prompts selection of an operation method at the time of collation, and displays the image on the display unit 21.

The image for selecting the operation method at the time of collation is, for example, an image that prompts selection of any of the operation methods described with reference to FIGS. 4 to 7, and may be, for example, an image in which images as illustrated in FIGS. 4 to 7 are minimized and displayed as icons that can be selected by tapping.

In step S32, the registration processing unit 51 determines whether or not the operation method at the time of collation has been selected, and repeats similar processing until it is determined that the operation method at the time of collation has been selected.

In step S32, in a case where the operation method at the time of collation has been selected, the processing proceeds to step S33.

In step S33, for example, as described with reference to FIGS. 8 and 9, the registration processing unit 51 displays an image prompting the user to set the operation method including the partial regions of the entire fingerprint to be registered and the order of tapping the partial regions of the entire fingerprint.

In step S34, the registration processing unit 51 executes registration information acquisition processing, and registers, in the storage unit 34, the feature amounts of the partial regions of the entire fingerprint in association with the operation method in accordance with the method of using the feature amounts of the partial regions that are required for the collation processing.

Figure 14:
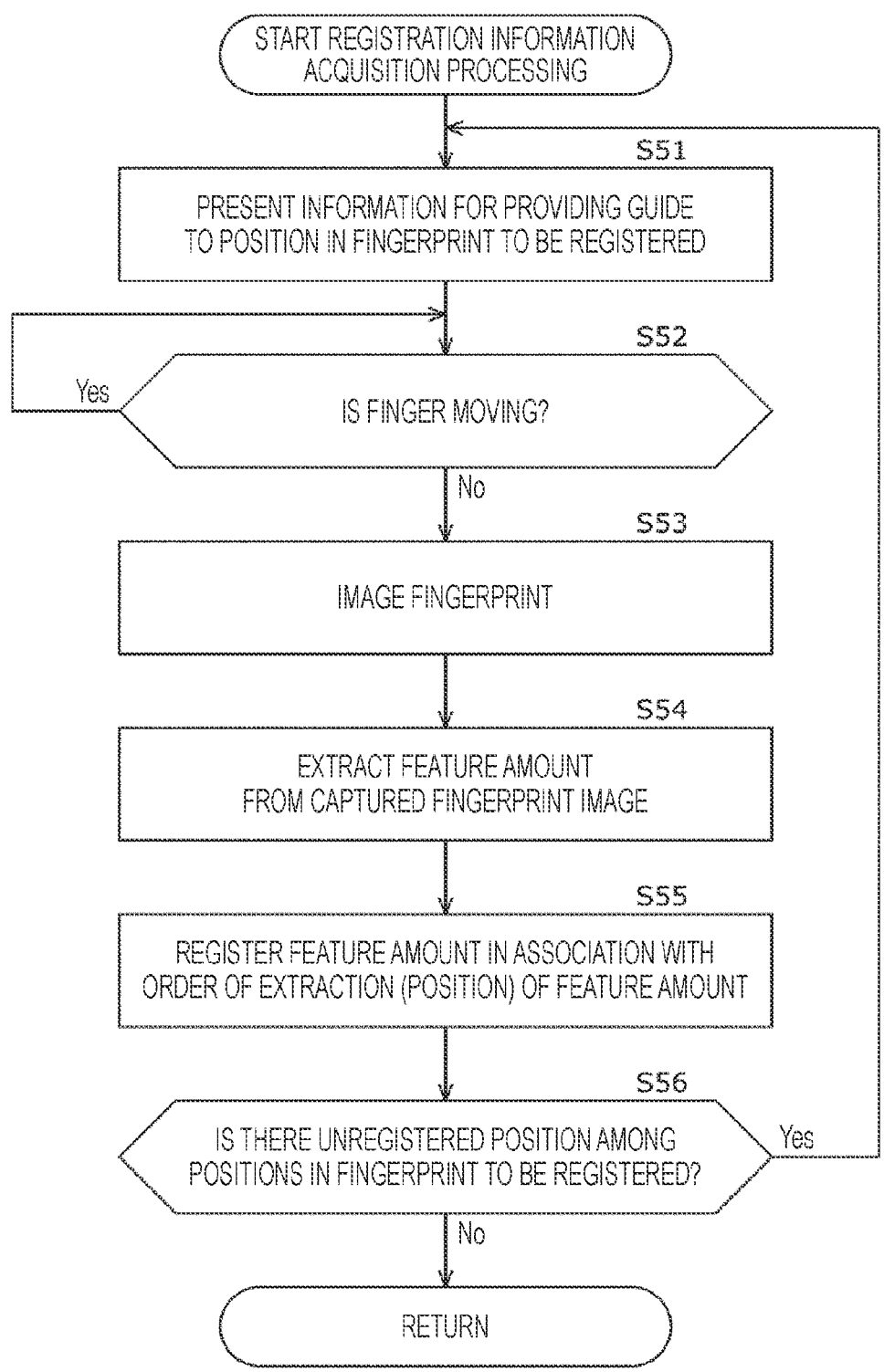
FIG. 14 is a flowchart illustrating registration information acquisition processing in a first embodiment.

Note that the registration information acquisition processing will be described later in detail with reference to FIG. 14.

In step S35, the registration processing unit 51 determines whether or not the acquired feature amounts are of sufficient quality.

Here, the quality of the feature amounts is an index indicating whether or not sufficient feature amounts have been obtained from the fingerprint in the regions required for the collation processing. Thus, for example, the registration processing unit 51 may prompt the user to execute the operation to be performed at the time of registration several times, and determine whether or not the acquired feature amounts are of sufficient quality on the basis of whether or not the authentication has been performed successively for a predetermined number of times or more.

In step S34, if the registration processing unit 51 has determined that the acquired feature amounts are not of sufficient quality, the processing returns to step S33, and the registration information acquisition processing is repeated.

Then, if it is determined in step S34 that the acquired feature amounts are of sufficient quality, the processing ends.

By the series of processing described above, it is possible to register the feature amounts of the partial regions of the entire fingerprint in association with the operation method corresponding to the method of using the feature amounts of the partial regions that are required for the collation processing.

Registration Information Acquisition Processing in First Embodiment

Next, the registration information acquisition processing in the first embodiment will be described with reference to a flowchart in FIG. 14.

In step S51, the registration processing unit 51 sets any of the unregistered partial regions as a position in the fingerprint to be registered on the basis of information regarding the registration method that has been set, and displays an image for providing a guide to the set position in the fingerprint to be registered to prompt presentation of the fingerprint at the position in the fingerprint to be registered.

More specifically, the registration processing unit 51 displays an image as illustrated in FIG. 10, for example, and provides a guide to the position in the fingerprint to be registered and prompts registration by emitting light in any of unregistered regions among the partial regions that have been set or displaying a thick frame surrounding any of the unregistered regions.

In step S52, on the basis of an image captured by the fingerprint imaging unit 22 or 23, the registration processing unit 51 determines whether or not there is movement in the image and the finger is moving. If the finger is moving, similar processing is repeated.

Then, if it is determined in step S52 that the finger is not moving, the processing proceeds to step S53.

In step S53, the registration processing unit 51 controls the fingerprint imaging unit 22 or 23 to capture a fingerprint image, and acquires the captured fingerprint image.

In step S54, the registration processing unit 51 supplies the acquired fingerprint image to the feature amount extraction unit 52 for extraction of a feature amount.

In step S55, the registration processing unit 51 acquires the feature amount extracted by the feature amount extraction unit 52, and stores the feature amount in the storage unit 34 in association with the ordinal number (position).

In step S56, the registration processing unit 51 determines whether or not there is a feature amount of an unregistered partial region in the entire fingerprint on the basis of the information regarding the operation method that has been set.

If it is determined in step S56 that there is a feature amount of an unregistered partial region of the entire fingerprint, the processing returns to step S51.

That is, the processing of steps S51 to S56 is repeated until it is determined in step S56 that there is no feature amount of an unregistered partial region of the entire fingerprint.

Then, if it is determined in step S56 that there is no feature amount of an unregistered partial region of the entire fingerprint, the processing ends.

By the above processing, the user can register the feature amounts at the positions of the partial regions of the entire fingerprint set by the user and the operation method including the order of tapping.

At this time, as illustrated in FIG. 10, it is possible to register the feature amounts and the operation method while checking the positions of the partial regions to be registered and the order thereof. Thus, it is possible to register information regarding the operation method that needs to be memorized and is partially necessary for collation while viewing the information.

Thus, it is possible to make it easier for the user himself or herself to memorize the operation method including the positions of the partial regions set by the user and the order.

Note that, is a case where an image of the entire fingerprint is captured by the fingerprint imaging unit 23, the feature amounts of all the partial regions are acquired in one cycle of processing.

However, in the case where the image of the entire fingerprint is captured by the fingerprint imaging unit 23, the feature amounts of the partial regions necessary for collation may be excluded from the feature amounts to be stored in the storage unit 34.

This allows for minimization of the amount of leaked information even in a case where the information regarding the feature amounts stored in the storage unit 34 has been leaked.

<Collation Processing>

Figure 15:
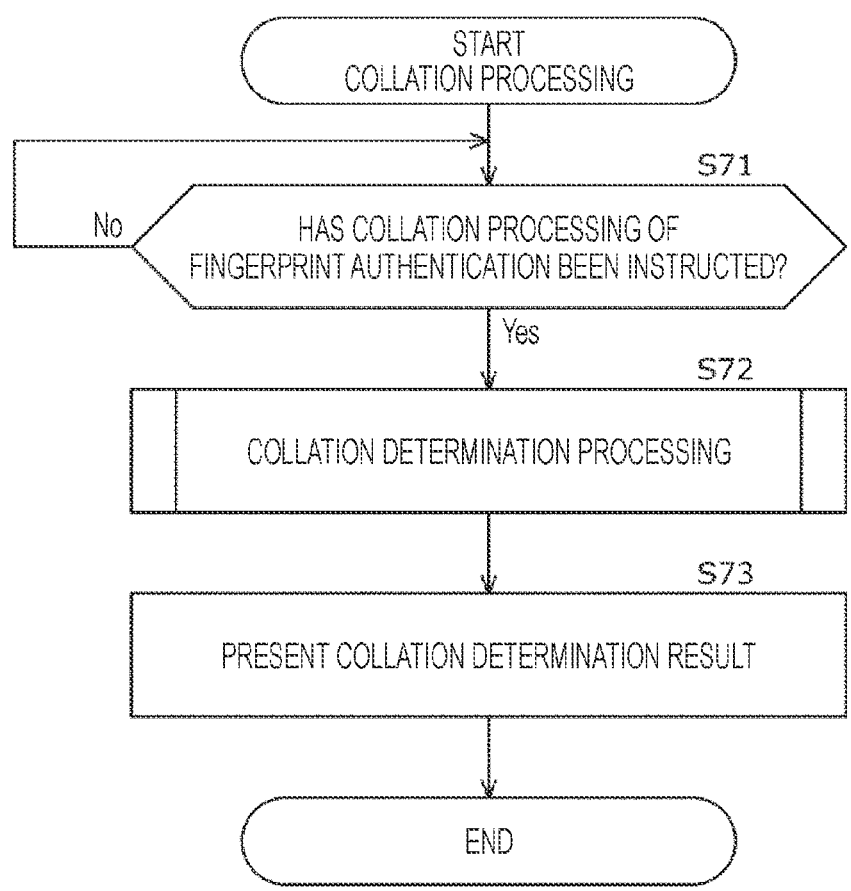
FIG. 15 is a flowchart illustrating collation processing.

Next, collation processing will be described with reference to a flowchart in FIG. 15.

Note that the collation processing is based on an assumption that an operation method including the positions of the partial regions set by the user by the registration processing described above and the order thereof has been registered.

In step S71, the collation processing unit 53 determines whether or not some kind of collation processing of fingerprint authentication has been requested by a finger or the like being brought into contact with the fingerprint imaging unit 22 or 23, and repeats similar processing until such a request is received.

Then, if it is determined in step S71 that collation processing fingerprint authentication has been requested, the processing proceeds to step S72.

In step S72, the collation processing unit 53 executes collation determination processing to perform collation with a fingerprint, and determines whether the authentication is successful (OK) or failed (failure).

Figure 16:
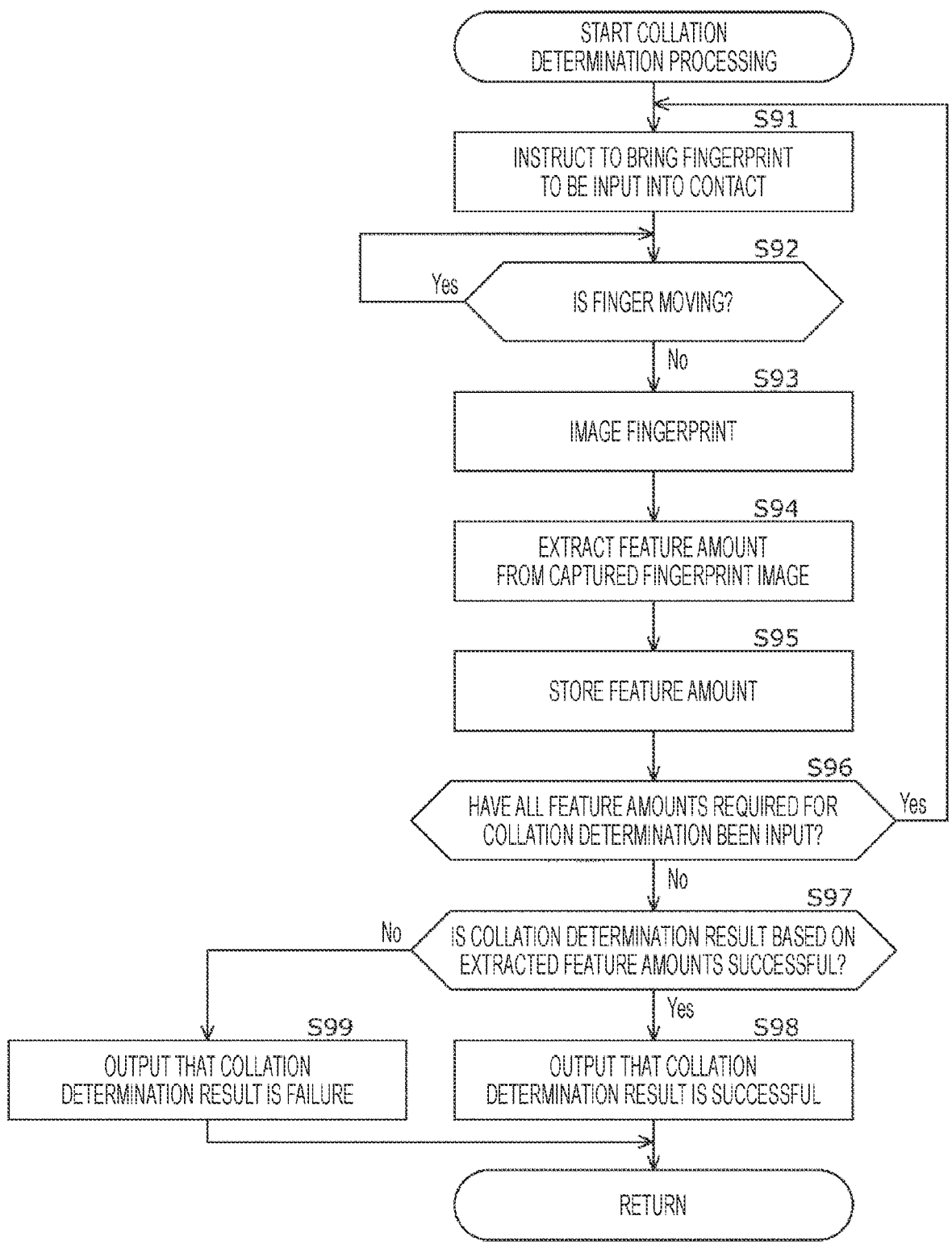
FIG. 16 is a flowchart illustrating collation determination processing in the first embodiment.

The collation determination processing will be described later in detail with reference to a flowchart in FIG. 16.

In step S73, the collation processing unit 53 presents whether the authentication has succeeded or failed on the basis of an authentication determination result of the collation determination processing.

By the above processing, the collation processing by fingerprint authentication is performed, and the result of authentication with the fingerprint is presented.

Collation Determination Processing in First Embodiment

Next, the collation determination processing in the first embodiment will be described with reference to the flowchart in FIG. 16.

In step S91, the collation processing unit 53 displays, on the display unit 21, an image prompting bringing a partial region of the entire fingerprint to be input into contact with the fingerprint imaging unit 22 or 23 for presentation.

In step S92, on the basis of an image captured by the fingerprint imaging unit 22 or 23, the collation processing unit 53 determines whether or not there is movement in the image, and a finger is in contact with the fingerprint imaging unit 22 or 23 and is moving. If it is determined that the finger is moving, similar processing is repeated.

Then, if it is determined in step S92 that the finger is not moving, that is, if the movement of the finger being in contact with the fingerprint imaging unit 22 or 23 has stopped and it is determined that the user has an intention of presenting the fingerprint of the partial region of the entire fingerprint at the position of contact, the processing proceeds to step S93.

In step S93, the collation processing unit 53 controls the fingerprint imaging unit 22 or 23 to capture a fingerprint image, and acquires the captured fingerprint image.

In step S94, the collation processing unit 53 supplies the acquired fingerprint image to the feature amount extraction unit 52 for extraction of a feature amount.

In step S95, the collation processing unit 53 acquires the feature amount extracted by the feature amount extraction unit 52, and stores the feature amount in association with the ordinal number.

In step S96, the collation processing unit 53 determines whether or not all the feature amounts required for the collation determination have been input on the basis of the operation method registered by the registration processing.

If it is determined in step S96 that all the feature amounts (corresponding to the number of registered feature amounts) required for collation determination have not been input, the processing returns to step S91.

That is, in step S96, the processing of steps S91 to S96 is repeated until it is determined that all the feature amounts required for the collation determination have been input, and the feature amounts required for the collation determination are stored.

Then, if it is determined in step S96 that all the feature amounts required for the collation determination have been input, the processing proceeds to step S97.

In step S97, the collation processing unit 53 performs collation determination on the basis of the extracted feature amounts that have been stored.

That is, the collation processing unit 53 determines whether the collation result is authentication successful or authentication failed on the basis of whether or not the extracted feature amounts that have been stored match the registered feature amounts and the order in which the feature amounts have been extracted matches the registered order.

In step S97, if the collation result is authentication successful, the processing proceeds to step S98.

In step S98, the collation processing unit 53 outputs that the collation determination result is authentication successful.

Furthermore, in step S97, if the collation result is authentication failed, the processing proceeds to step S99.

In step S99, the collation processing unit 53 outputs that the collation determination result is authentication failed.

By the above processing, it is possible to appropriately implement collation processing on the basis of the feature amounts of the partial regions of the registered entire fingerprint and the order of presentation.

Note that, in a case where the fingerprint imaging unit 23 is used, there is a possibility that the entire fingerprint of the finger presented by the user is imaged, which makes it difficult to identify which partial region has been tapped.

Thus, in a case where the fingerprint imaging unit 23 is used in the registration processing and the collation processing, in order that only a partial region of the entire fingerprint may be imaged, for example, a region in the fingerprint imaging unit 23 excluding a range having a size of about 3 mm×3 mm (a size corresponding to the size of the set partial region) may be set as a dead zone, and a region excluding the dead zone in which the fingerprint is imaged may be displayed with a frame or the like on the display unit 21 so that the user can view the region as a range in which the fingerprint can be imaged, so that only the partial region of the entire fingerprint designated by the user may be imaged.

3. Second Embodiment

In the example described above, the collation processing is implemented on the basis of the feature amounts acquired by tapping the fingerprint imaging unit 22 or 23 sequentially with different positions of the partial regions of the entire fingerprint.

However, it is also possible to implement the collation processing not by tapping but by sliding on the fingerprint imaging unit 22 or 23 and on the basis of a fingerprint image captured by the fingerprint imaging unit 22 or 23 during the sliding.

Figure 17:
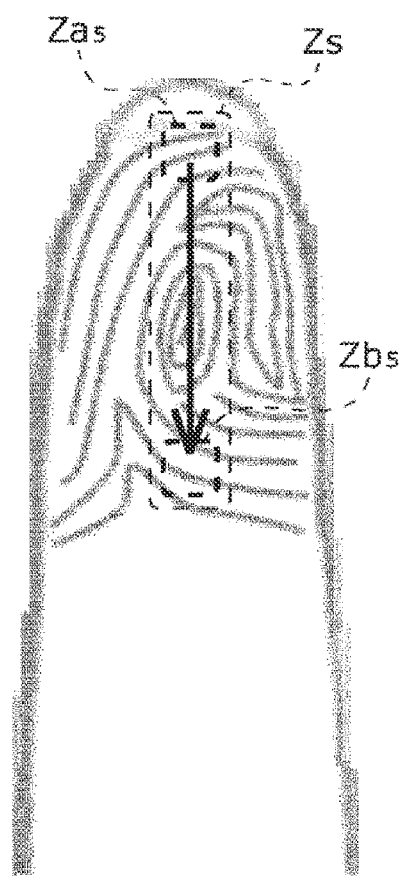
FIG. 17 is a diagram illustrating a second embodiment.

That is, as illustrated in FIG. 17, in a region Z of an entire fingerprint, a region Za5 as a start point and a region Zb5 as an end point are set, and a position indicated by an arrow from the region Za5 as the start point to the region Zb5 as the end point is slid in a state of being in contact with a fingerprint imaging unit 22 or 23.

When a finger is slid as described above, collation processing may be performed on the basis of feature amounts extracted from a fingerprint image in a region Zs imaged by the fingerprint imaging unit 22 or 23.

In this case, the information to be registered that is necessary for the collation processing may be information regarding the feature amounts designated by a user among the feature amounts in the region Za5 as a start point position and the region Zb5 as an end point position of the finger that is slid in a state of being in contact with the fingerprint imaging unit 22 or 23 and the feature amounts extracted from a fingerprint image captured by the fingerprint imaging unit 22 or 23 during the sliding from the region Za5 as the start point position to the region Zb5 as the end point position.

Furthermore, in a case where the feature amounts are minutiae, which are not extracted from every region of the entire fingerprint, at the time of registration processing, among regions in which minutiae have been detected, the minutiae being feature amounts extracted from an actually captured fingerprint image, regions in which a relatively large number of minutiae are detected and collation errors are less likely to occur may be presented to a user so that the user can select and register from among the regions.

Registration Information Acquisition Processing an Second Embodiment

Figure 18:
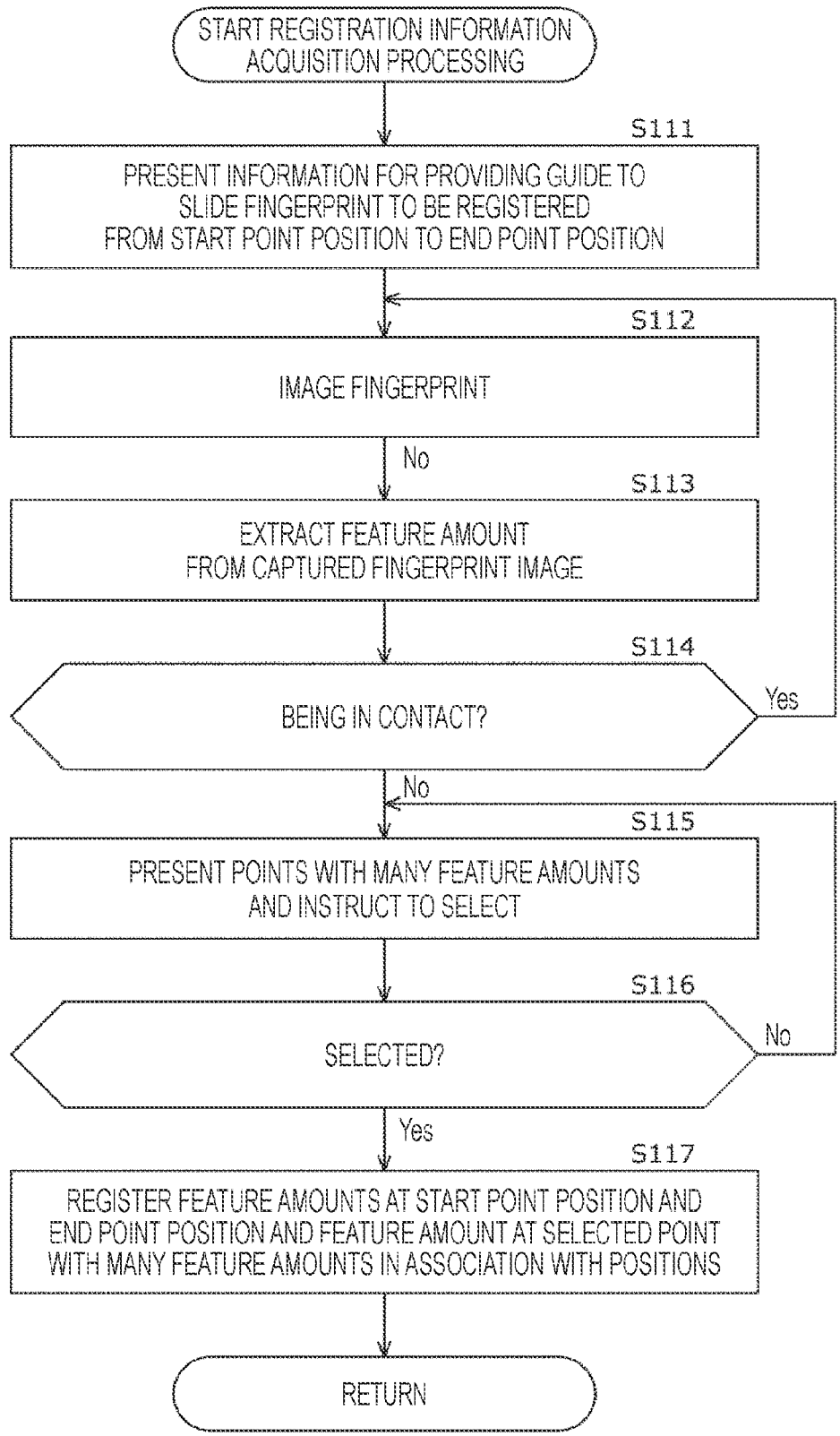
FIG. 18 is a flowchart illustrating registration information acquisition processing in the second embodiment.

Next, registration information acquisition processing in a first modified example will be described with reference to a flowchart in FIG. 18. Note that the registration processing in the second embodiment is the same as the processing in FIG. 13, and thus the description thereof will be omitted.

In step S111, a registration processing unit 51 displays, on a display unit 21, an image prompting sliding of the finger from the start point position to the end point position in a state where the finger is in contact with the fingerprint imaging unit 22 or 23.

In step S112, the registration processing unit 51 controls the fingerprint imaging unit 22 or 23 to capture a fingerprint image, and acquires the captured fingerprint image.

In step S113, the registration processing unit 51 supplies the acquired fingerprint image to a feature amount extraction unit 52 for extraction of a feature amount, and stores the feature amount.

In step S114, the registration processing unit 51 controls the fingerprint imaging unit 22 or 23 to determine whether or not a state where the finger is in contact with the fingerprint imaging unit 22 or 23 is continuing on the basis of the captured fingerprint image.

If it is determined in step S114 that the contacting state is continuing, the processing returns to step S112.

That is, as long as the contacting state of the finger is continuing, it is assumed that the finger is sliding in the state of being in contact with the fingerprint imaging unit 22 or 23. Thus, the processing of steps S112 to S114 is repeated, in which processing of imaging a fingerprint image of the finger being in contact with the fingerprint imaging unit 22 or 23, and extracting and storing a feature amount is continued.

Then, if it is determined in step S114 that the finger is not in contact with the fingerprint imaging unit 22 or 23, the processing proceeds to step S115.

In step S115, the registration processing unit 51 extracts, from the stored information regarding the feature amounts, regions in which more than a predetermined number of feature amounts are detected, presents the regions to the user, and displays an image prompting the user to select any one or more of the regions as a region to be registered.

In step S116, the registration processing unit 51 determines whether or not any one or more of the presented regions in which more than a predetermined number of feature amounts are detected has been selected, and repeats similar processing until any one or more of the presented regions in which more than a predetermined number of feature amounts are detected are selected.

If it is determined in step S116 that any one or more of the regions in which more than a predetermined number of feature amounts are detected have been selected, the processing proceeds to step S117.

In step S117, the registration processing unit 51 registers, in a storage unit 34, the feature amount in each of the regions at the start point position and the end point position and the feature amounts in the selected region in which more than a predetermined number of feature amounts have been detected, in association with the positions.

By the above processing, the user slides the finger to be registered from the start point position to the end point position in a state where the finger is in contact with the fingerprint imaging unit 22 or 23, and selects a region to be registered from among the extracted regions in which more than a predetermined number of feature amounts are detected, so that the feature amount in each of the regions at the start point position and the end point position and the feature amounts in the selected region in which more than a predetermined number of feature amounts have been detected can be registered in the storage unit 34 in association with the positions.

As a result, in the collation processing, it is possible to register information required for fingerprint authentication by bringing the finger into contact with the fingerprint imaging unit 22 or 23 and sliding the finger from the start point position to the end point position the user has registered in the registration information acquisition processing.

Note that the feature amounts at the start point position and the end point position may not be detected in a case where minutiae are used as the feature amounts. Thus, for example, minutiae may be registered as the feature amounts in a case where the minutiae are detected, and fingerprint patterns may be registered as the feature amounts in a case where minutiae are not detected.

Furthermore, in the example described above, regions in which more than a predetermined number of feature amounts are detected are extracted, the regions are presented to the user, and any one or more of the regions are selected and registered. Alternatively, the regions in which there are more than a predetermined number of feature amounts may be automatically selected as regions to be registered.

Moreover, it is possible to allow for switching between whether one or more of the regions in which there are more than a predetermined number of feature amounts are to be selected by the user or the regions is which there are more than a predetermined number of feature amounts are to be automatically selected. It is also possible to set so that, in a case where any of the presented regions in which there are more than a predetermined number of feature amounts is selected, the selected region is registered, and in a case where none of the regions is selected, all of the regions are automatically selected.

Collation Determination Processing in Second Embodiment

Figure 19:
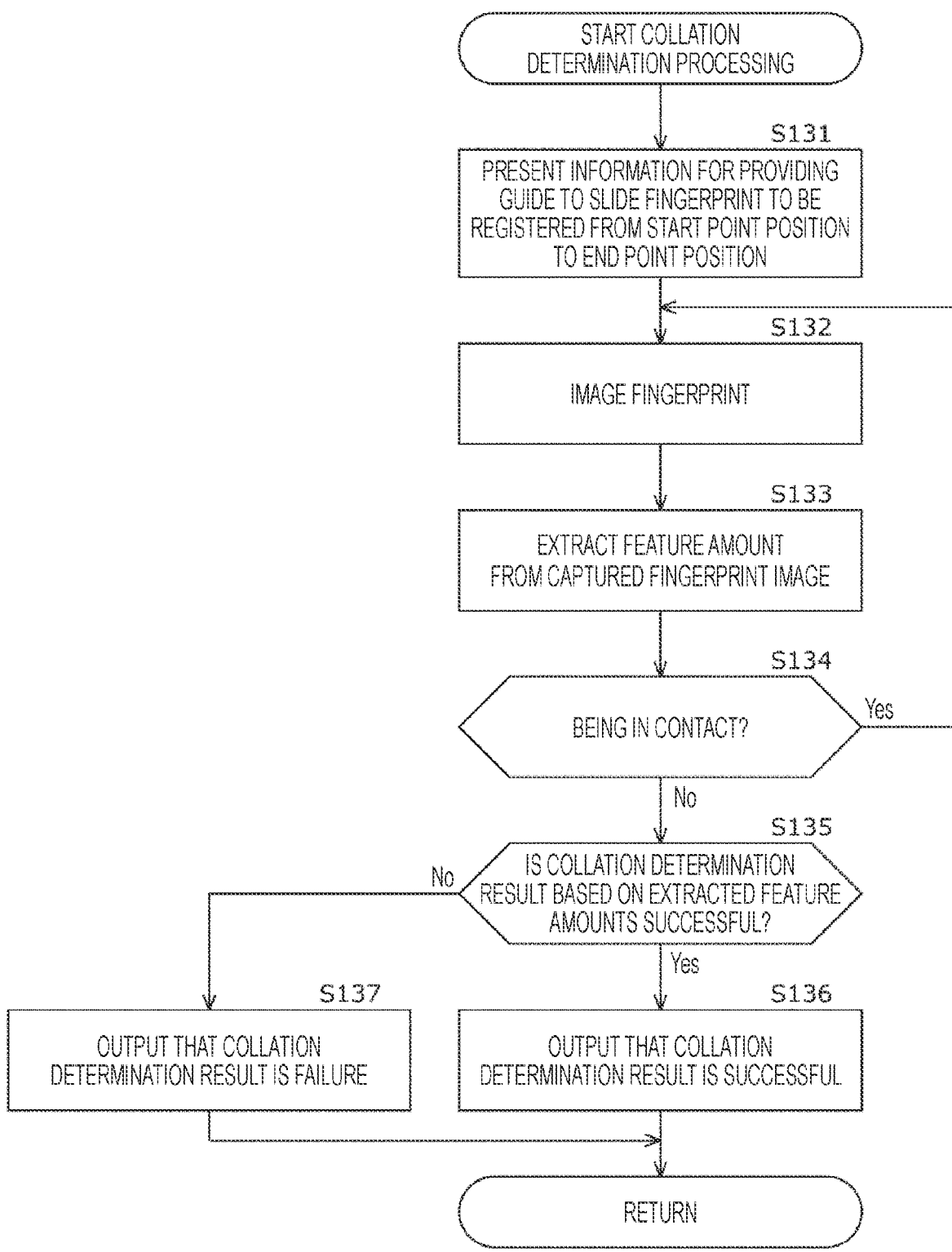
FIG. 19 is a flowchart illustrating collation determination processing in the second embodiment.

Next, collation determination processing in the second embodiment will be described with reference to a flowchart in FIG. 19. The collation processing in the second embodiment is the same as the processing described with reference to the flowchart in FIG. 15, and thus the description thereof will be omitted.

In step S131, a collation processing unit 53 displays, on the display unit 21, an image prompting sliding from the start point position to the end point position is which the finger is slid in a state of being in contact with the fingerprint imaging unit 22 or 23.

In step S132, the collation processing unit 53 controls the fingerprint imaging unit 22 or 23 to capture a fingerprint image, and acquires the captured fingerprint image.

In step S133, the collation processing unit 53 supplies the acquired fingerprint image to the feature amount extraction unit 52 for extraction of a feature amount, and stores the feature amount.

In step S134, the collation processing unit 53 controls the fingerprint imaging unit 22 or 23 to determine whether or not a state where the finger is in contact with the fingerprint imaging unit 22 or 23 is continuing on the basis of the captured fingerprint image.

If it is determined in step S134 that the contacting state is continuing, the processing returns to step S132.

That is, as long as the contacting state of the finger is continuing, it is assumed that the finger is sliding in the state of being in contact with the fingerprint imaging unit 22 or 23. Thus, the processing of steps S132 to S134 is repeated, in which processing of imaging a fingerprint image of the finger being in contact with the fingerprint imaging unit 22 or 23, and extracting and storing a feature amount is continued.

Then, if it is determined in step S134 that the finger is not in contact with the fingerprint imaging unit 22 or 23, the processing proceeds to step S135.

In step S135, the collation processing unit 53 performs collation determination on the basis of the extracted feature amounts that have been stored.

More specifically, the collation processing unit 53 compares the feature amount in each of the regions at the start point position and the end point position and the feature amounts in the region in which more than a predetermined number of feature amounts have been detected, the feature amounts being extracted by the processing of steps S112 to S114, with the registered similar feature amounts, and determines whether the collation result is authentication successful or authentication failed on the basis of whether or not the feature amounts match each other.

If the collation result is authentication successful in step S135, the processing proceeds to step S136.

In step S136, the collation processing unit 53 outputs that the collation determination result is authentication successful.

Furthermore, if the collation result is authentication failed in step S135, the processing proceeds to step S137.

In step S137, the collation processing unit 53 outputs that the collation determination result is authentication failed.

By the above processing, it is possible to implement the fingerprint authentication by bringing the finger into contact with the fingerprint imaging unit 22 or 23 and sliding the finger from the start point position to the end point position registered by the user in the registration information acquisition processing.

Note that, in the example described above, the finger is brought into contact with the fingerprint imaging unit 22 or 23 and is linearly slid from the start point position to the end point position. Alternatively, the finger may be slid in an S shape, or may be slid in a freeform curve.

That is, for example, instead of tapping with the regions Za2 to Zd2 in sequence as described with reference to FIG. 5, sliding through the regions Za2 to Zd2 may be performed.

Furthermore, the fingerprint authentication may be implemented by registration and collation using a combination of the feature amounts obtained by bringing the finger into contact with the fingerprint imaging unit 22 or 23 and tapping described in the first embodiment and the feature amounts obtained by sliding described in the second embodiment.

That is, for example, for the regions Za4 to Zd4 as described with reference to FIG. 7, the regions Za4 and Zb4 may be tapped in any order, and sliding through the regions Zc4 and Zd4 in this order may be performed instead of successively tapping the regions Zc4 and Zd4 in this order.

In other words, it can also be said that, in addition to the feature amounts of the partial regions of the entire fingerprint and the order thereof, the way of moving the finger or the way of touching by the finger (operation method) such as tapping or sliding when the finger is brought into contact with the fingerprint imaging unit 22 or 23 is registered in association with the feature amounts and the order, and used for collation.

Furthermore, the authentication method described in the first embodiment and the second embodiment described above may be used for tagging (pairing) between the smartphone 11 and another device (e.g., a wearable device).

With such an authentication method, authentication for identification and tagging (pairing) between the smartphone 11 and another device can be simultaneously achieved.

Moreover, due to such tagging (pairing), for example, in a case where the user is carrying or taking along the smartphone 11 in a state where the user is wearing another device such as a tagged (paired) wearable device, in other words, in a case where the tagged (paired) smartphone 11 and the other device are in a state of being close to each other (a state where the same user is carrying both), a state where the authentication is successful may be maintained. However, in this case, when the state where the other device is being worn cannot be confirmed, the tagged (paired) state is canceled, and the other device gets into an unauthenticated state.

With this arrangement, as long as the smartphone 11 and the other device are in a state of being close to each other, it is possible to use any one of the smartphone 11 or the other device to perform an operation that requires identification. Examples of the operation that requires identification include an operation for payment for an application program using the smartphone 11, input of an unlock password, or the like, an operation related to personal authentication using the position of the smartphone 11 or the like, and an operation related to payment implemented by holding the other device over a predetermined reader/writer or the like using a communication technology including a short-range wireless communication standard such as near field communication (NFC) provided in the other device.

Therefore, for example, in a case, where the smartphone 11 has a fingerprint authentication function but the other device does not have a fingerprint authentication function, after fingerprint authentication has been performed with the smartphone 11 only once in tagging (pairing), as long as a state where the two are close to each other is maintained and a state where the authentication is successful is continuing, it is possible to repeatedly implement processing that requires identification only with the other device that does not have the fingerprint authentication function (without taking out, that is, without using, the smartphone 11).

4. First Modified Example

In the example described above, the fingerprint authentication is performed on the basis of the feature amounts extracted by the user bringing the finger into contact with the fingerprint imaging unit 22 or 23 and sliding the finger linearly, in an S shape, or in a freeform curve from the start point position to the end point position in the region of the entire fingerprint registered by the registration information acquisition processing by the user.

Figure 20:
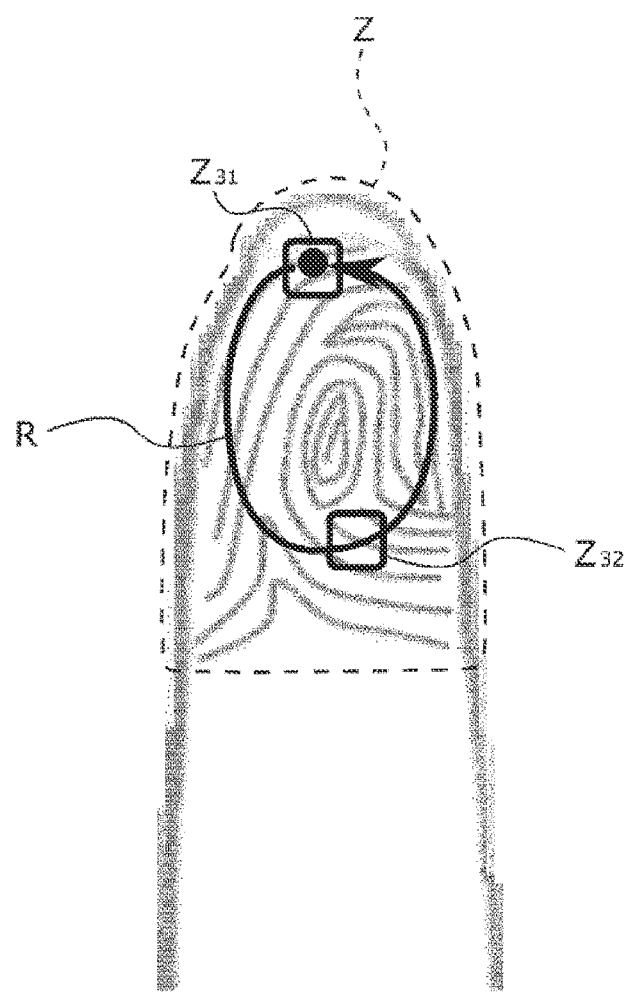
FIG. 20 is a diagram illustrating a first modified example.

However, as illustrated in FIG. 20, the finger may be slid annularly from a region Z31 as the start point position via a region Z32 at an intermediate position.

Furthermore, at this time, an optical flow obtained from a fingerprint image captured by the fingerprint imaging unit 22 or 23 during sliding may be used as a feature amount.

Using an optical flow as a feature amount allows for obtaining a feature amount in accordance with a route during sliding, and thus, more accurate collation can be performed.

Furthermore, at the time of registration, it is only necessary to instruct the user about a shape of a movement route, without the need for presenting an image related to the registration as described with reference to FIGS. 8 to 10. Thus, it is possible to facilitate the registration processing and the collation processing.

Note that, in a case where an optical flow is used as a feature amount, the sliding route may be, for example, S-shaped or semicircular-shape, instead of being linear or annular.

Furthermore, as long as the way of moving the finger or the way of touching by the finger (operation method) such as tapping and sliding can be detected in association with the feature amounts of the partial regions of the entire fingerprint, a feature amount other than an optical flow may be used. For example, a result of detection using a touch sensor or the like may be used as a feature amount, and the way of tapping and the way of sliding may be recognized. At this time, for example, ordinal numbers of feature amounts of a plurality of partial regions of the entire fingerprint may not be specified, and the was; of moving the finger or the way of touching by the finger that allows for acquiring all the feature amounts may be registered and used for collation.

5. Second Modified Example

In the example described above, the registration processing and the collation processing are performed with the smartphone. Alternatively, an electronic device other than the smartphone 11 may be used as long as the device has a configuration corresponding to the fingerprint imaging unit 22 or 23. For example, the device may be a smartwatch as illustrated in FIG. 21.

Figure 21:
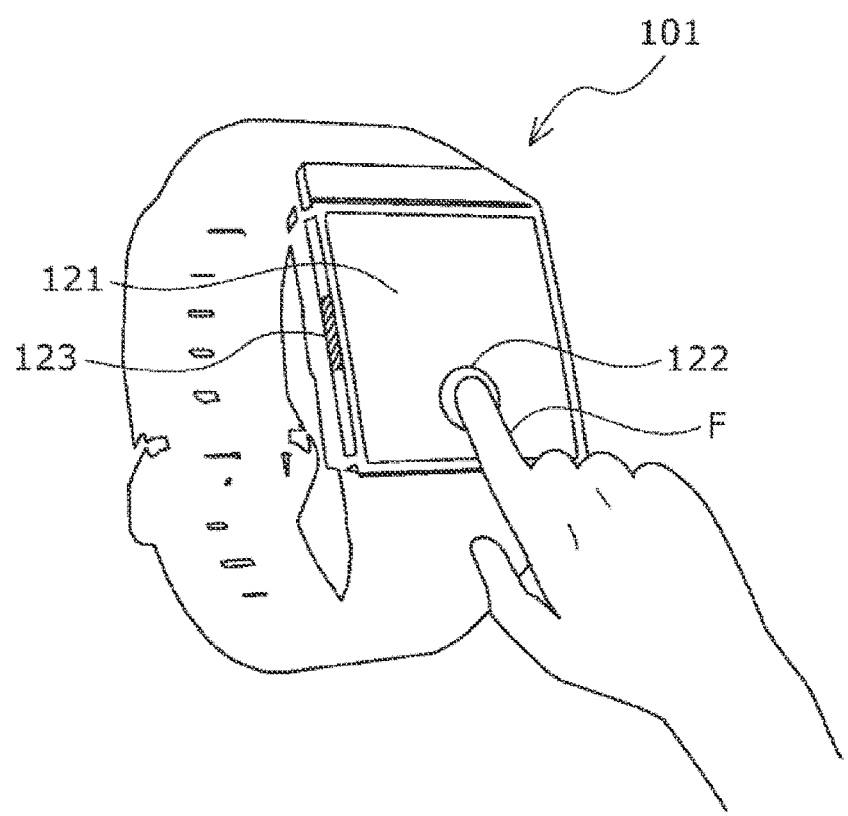
FIG. 21 is a diagram illustrating a second modified example.

A smartwatch 101 in FIG. 21 includes a display unit 121 and fingerprint imaging units 122 and 123.

The display unit 121 and the fingerprint imaging units 122 and 123 correspond to the display unit 21 and the fingerprint imaging units 22 and 23 of the smartphone 11 in FIG. 2, respectively.

Thus, even in the case of the smartwatch 101 in FIG. 21, it is sufficient if at least either the fingerprint imaging unit 122 or the fingerprint imaging unit 123 is included.

Furthermore, as long as any of the fingerprint imaging unit 22 or 122 or the fingerprint imaging unit 23 or 123 is included, a configuration other than the smartphone 11 or the smartwatch 101 described above may be used. For example, the configuration may be a personal computer or a security device that uses fingerprint authentication for locking or unlocking a door.

Moreover, the configuration may be a device that executes only the registration processing described above and functions only as a registration device or a device that executes only the collation processing described above and functions only as a collation device.

In this case, information regarding a feature amount and an operation method registered by the device that executes only the registration processing and functions as a registration device may be registered and stored in, for example, a cloud server.

Furthermore, in this case, the device that executes only the collation processing and functions as a collation device may perform the collation processing by collating the feature amount and the operation method acquired in the collation processing with the feature amount and the operation method registered in the cloud server.

Note that the configuration of hardware of the smartwatch 101 is substantially similar to the configuration in FIG. 3 except for a difference in size, and thus the description thereof will be omitted.

Furthermore, the registration processing and the collation processing by the smartwatch 101 are similar to the processing by the smartphone 11 described with reference to the flowcharts in FIGS. 13 and 15, and thus the description thereof will be omitted.

6. Application Example

The registration processing and the collation processing using the feature amounts of the partial regions of the entire fingerprint have been described above. Alternatively, since the feature amounts of the partial regions of the entire fingerprint can be individually registered, a specific command may be assigned to each of the registered feature amounts, and the command corresponding to the acquired feature amount may be executed.

Figure 22:
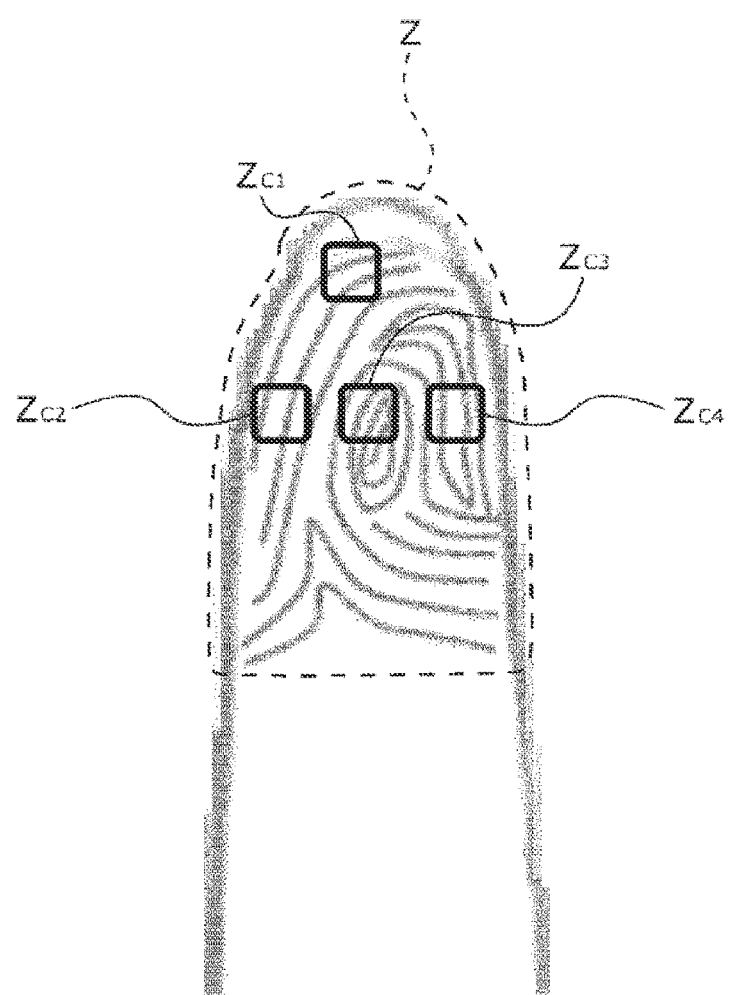
FIG. 22 is a diagram illustrating an application example.

For example, as illustrated in FIG. 22, a command such as play, next track, pause, or previous track for operating application software for a media player or the like may be assigned to each of the feature amounts of the partial regions Zc1, Zc2, Zd3, and Zc4 in the region Z of the entire fingerprint.

That is, a command has been assigned to each region as described above so that a play command is executed when the region Zc1 of the user's finger is brought into contact with the fingerprint imaging unit 22 or 23 by the user, a next track command is executed when the region Zc2 is brought into contact, a pause command is executed when the region Zc1 is brought into contact, and a previous track command is executed when the region Zc4 is brought into contact.

With this arrangement, it is possible to assign commands in accordance with the user's preference. For example, it is possible to assign a frequently used command to a region that is easier for the user to operate, and assign a plurality of commands that are repeatedly used to adjacent regions.

Furthermore, since it is possible to assign commands in accordance with the feature amounts in the partial regions of the entire fingerprint and the operation method for each user, even in a case where one smartphone 11 or smartwatch 101 is used by a plurality of users, it is possible to change the regions to which the commands are assigned in accordance with the user who is using the smartphone 11 or smartwatch 101.

Moreover, since only the users for which a feature amount has been registered for each partial region by the registration processing can use the smartphone 11 or smartwatch 101, use by a third party can be restricted.

7. Example of Execution by Software

Incidentally, the series of pieces of processing described above can be executed not only by hardware but also by software. In a case where the series of pieces of processing is executed by software, a program constituting the software is installed from a recording medium into a computer built into dedicated hardware or, for example, a general-purpose computer capable of executing various functions with various programs installed therein.

Figure 23:
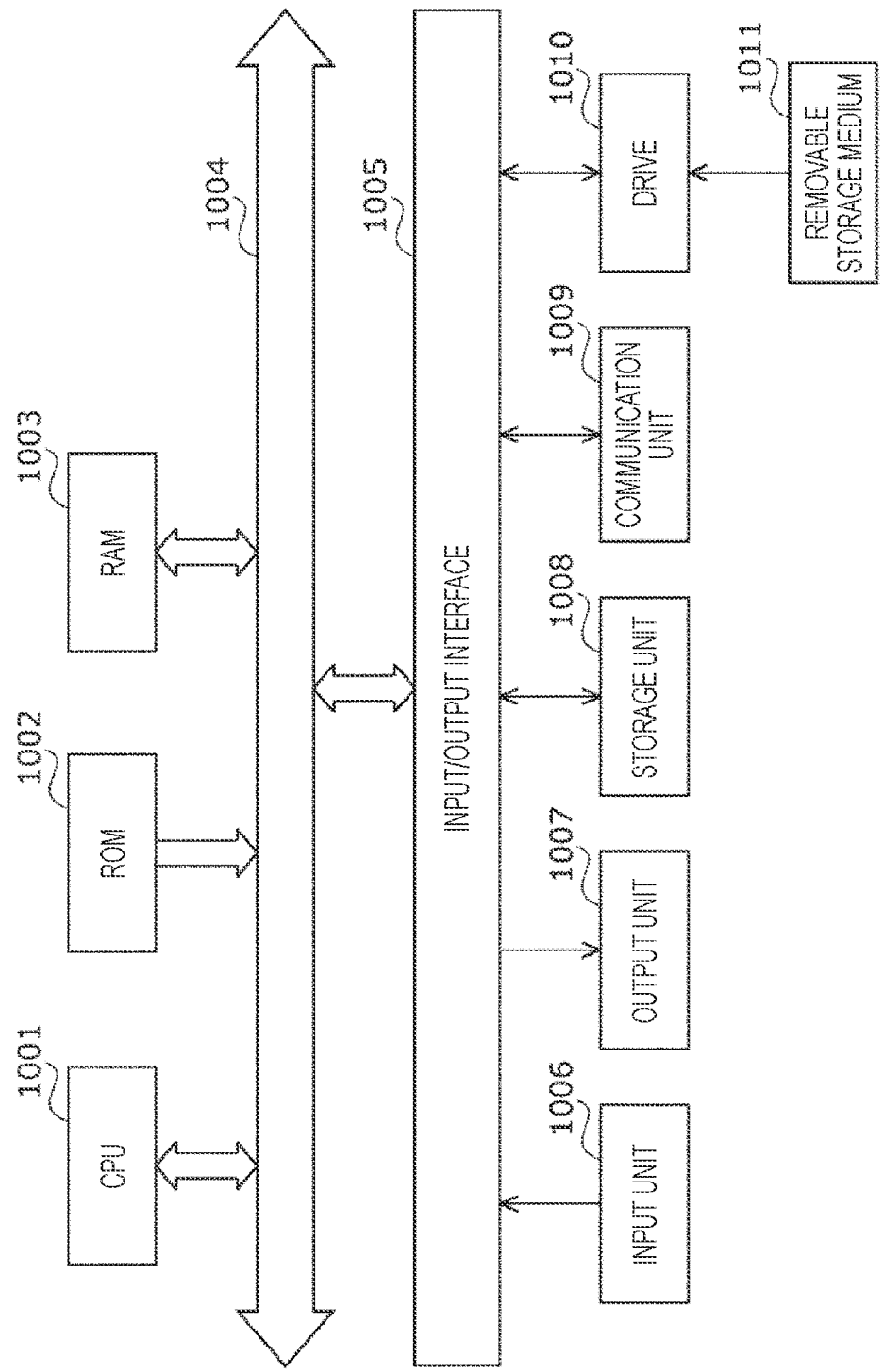
FIG. 23 is a diagram illustrating a configuration example of a general-purpose personal computer.

FIG. 23 illustrates a configuration example of the general-purpose computer. This personal computer has a built-in central processing unit (CPU) 1001. The CPU 1001 is connected with an input/output interface 1005 via a bus 1004. The bus 1004 is connected with a read only memory (ROM) 1002 and a random access memory (RAM) 1003.

The input/output interface 1005 is connected with an input unit 1006, an output unit 1007, a storage unit 1006, and a communication unit 1009. The input unit 1006 includes an input device such as a keyboard and a mouse used by a user to input an operation command. The output unit 1007 outputs a processing operation screen and an image of a processing result to a display device. The storage unit 1008 includes a hard disc drive or the like for storing programs and various types of data. The communication unit 1009 includes a local area network (LAN) adapter or the like and executes communication processing via a network as represented by the Internet. Furthermore, the input/output interface 1005 is connected with a drive 1010 that reads and writes data from and to a removable storage medium 1011 such as a magnetic disc (including a flexible disc), an optical disc (including a compact disc-read only memory (CD-ROM) and a digital versatile disc (DVD)), a magneto-optical disc (including Mini Disc (MD)), or a semiconductor memory.

The CPU 1001 executes various types of processing according to a program stored in the ROM 1002 or a program that is read from the removable storage medium 1011 such as a magnetic disc, an optical disc, a magneto-optical disc, or a semiconductor memory, installed in the storage unit 1008, and loaded from the storage unit 1008 into the RAM 1003. The RAM 1003 also stores, as appropriate, data or the like necessary for the CPU 1001 to execute various types of processing.

To perform the series of pieces of processing described above, the computer configured as described above causes the CPU 1001 to, for example, load a program stored in the storage unit 1008 into the RAM 1003 via the input/output interface 1005 and the bus 1004 and then execute the program.

The program to be executed by the computer (CPU 1001) can be provided by, for example, being recorded on the removable storage medium 1011 as a package medium or the like. Furthermore, the program can be provided via a wired or wireless transmission medium such as a local area network, the Internet, or satellite broadcasting.

Inserting the removable storage medium 1011 into the drive 1010 allows the computer to install the program into the storage unit 1008 via the input/output interface 1005. Furthermore, the program can be received by the communication unit 1009 via a wired or wireless transmission medium and installed into the storage unit 1008. In addition, the program can be installed in advance in the ROM 1002 or the storage unit 1008.

Note that the program to be executed by the computer may be a program that performs the pieces of processing in chronological order as described in the present specification, or may be a program that performs the pieces of processing in parallel or when needed, for example, when the processing is called.

Note that the CPU 1001 in FIG. 22 implements the function of the control unit 31 in FIG. 3.

Furthermore, in the present specification, a system means a set of a plurality of components (devices, modules (parts), and the like), and it does not matter whether or not all components are in the same housing. Thus, a plurality of devices housed in separate housings and connected via a network, and one device having a plurality of modules housed in one housing are both systems.

Note that embodiments of the present disclosure are not limited to the embodiments described above, and can be modified in various ways within a scope of the present disclosure.

For example, the present disclosure can have a cloud computing configuration in which a plurality of devices shares one function and collaborates in processing via a network.

Furthermore, each step described in the flowcharts described above can be executed by one device or can be shared by a plurality of devices.

Moreover, in a case where a plurality of pieces of processing is included in one step, the plurality of pieces of processing included in that step can be executed by one device or can be shared by a plurality of devices.

Note that the present disclosure can also be configured as described below.

<1> An information processing apparatus including: a registration unit that registers feature amounts of partial regions of an entire fingerprint used at time of collation in association with a method of presenting the fingerprint in the partial regions of the entire fingerprint at the time of collation.

<2> The information processing apparatus according to <1>, further including:
  a fingerprint imaging unit that captures a fingerprint image that is an image of the fingerprint,
  in which the registration unit registers the feature amounts extracted from the partial regions of the entire fingerprint image used at the time of collation in association with a method of operation on the fingerprint imaging unit in accordance with the presentation method in which presentation is performed by extraction of the feature amounts at the time of collation.

<3> The information processing apparatus according to <2>, in which
  the registration unit registers the feature amounts extracted from the partial regions of the entire fingerprint image used at the time of collation in association with a method of operation on the fingerprint imaging unit in accordance with an order of presentation by extraction of the feature amounts.

<4> The information processing apparatus according to <2> or <3>, in which
  the registration unit registers the feature amounts extracted from the partial regions of the entire fingerprint image used at the time of collation in association with a method of operation on the fingerprint imaging unit in accordance with an order of presentation by extraction of the feature amounts and a way or touching.

<5> The information processing apparatus according to <2>, in which
  the registration unit registers the feature amounts extracted from the fingerprint image captured by the fingerprint imaging unit when the partial regions of the entire fingerprint are brought into contact with the fingerprint imaging unit at the time of collation in association with an operation method indicating an order in which the partial regions of the entire fingerprint are to be brought into contact with the fingerprint imaging unit in accordance with an order of presentation by extraction of the feature amounts.

<6> The information processing apparatus according to <2>, in which
  the registration unit registers the feature amounts extracted from the fingerprint image captured by the fingerprint imaging unit when the partial regions of the entire fingerprint are brought into contact with the fingerprint imaging unit and at least either tapped or slid at the time of collation in association with at least either an operation method indicating an order in which the partial regions of the entire fingerprint are to be tapped against the fingerprint imaging unit in accordance with an order of presentation by extraction of the feature amounts or an operation method indicating a route of sliding.

<7> The information processing apparatus according to <6>, in which
  the registration unit registers the feature amounts of the partial regions selected by a user in association with an operation method indicating which partial region of the entire fingerprint is to be slid through which route, the selected partial regions being selected from the presented partial regions from which more than a predetermined number of feature amounts are extracted, among the feature amounts extracted from the fingerprint image captured by the fingerprint imaging unit when the partial regions of the entire fingerprint are brought into contact with the fingerprint imaging unit and slid at the time of collation.

<8> The information processing apparatus according to <2>, further including:
  a feature amount extraction unit that extracts at least either minutiae or fingerprint patterns as the feature amounts from the fingerprint image <9> The information processing apparatus according to <8>, in which
  the registration unit registers the fingerprint patterns as the feature amounts in the partial regions in a case where the minutiae fail to be extracted from the feature amount extraction unit.

<10> An information processing method including the step of:
  registering feature amounts of partial regions of an entire fingerprint used at time of collation in association with a method of presenting the fingerprint in the partial regions of the entire fingerprint at the time of collation.

<11> An information processing apparatus including:
  a collation unit that performs collation on the basis of whether or not feature amounts of partial regions of an entire fingerprint and a method of presenting the fingerprint in the partial regions of the entire fingerprint match the feature amounts of the partial regions of the entire fingerprint and the method of presentation registered in advance.

<12> The information processing apparatus according to <11>, further including:
  a fingerprint imaging unit that captures a fingerprint image that is an image of the fingerprint,
  in which the collation unit performs collation on the basis of whether or not the feature amounts extracted from the partial regions of the entire fingerprint image and a method of operation on the fingerprint imaging unit in accordance with a presentation method in which presentation is performed by extraction of the feature amounts match the feature amounts of the partial regions of the entire fingerprint and the method of operation registered in advance.

<13> The information processing apparatus according to <12>, in which the collation unit performs collation on the basis of whether or not the feature amounts extracted from the partial regions of the entire fingerprint image and the method of operation on the fingerprint imaging unit in accordance with an order presented by extraction of the feature amounts match the feature amounts of the partial regions of the entire fingerprint and the method of operation registered in advance.

<14> The information processing apparatus according to <12> or <13>, in which the collation unit performs collation on the basis of whether or not the feature amounts extracted from the partial regions of the entire fingerprint image and the method of operation on the fingerprint imaging unit in accordance with an order of presentation by extraction of the feature amounts and a way of touching match the feature amounts: of the partial regions of the entire fingerprint and the method of operation registered in advance.

<15> The information processing apparatus according to <12>, in which the collation unit performs collation on the basis of whether or not the feature amounts extracted from the fingerprint image captured by the fingerprint imaging unit when the partial regions of the entire fingerprint are brought into contact with the fingerprint imaging unit and the method of operation indicating an order in which the partial regions of the entire fingerprint are to be brought into contact with the fingerprint imaging unit in accordance with an order of presentation by extraction of the feature amounts match the feature amounts of the partial regions of the entire fingerprint and the method of operation registered in advance.

<16> The information processing apparatus according to <12>, in which the collation unit performs collation on the basis of whether or not the feature amounts extracted from the fingerprint image captured by the fingerprint imaging unit when at least either tapping or sliding is performed with the partial regions of the entire fingerprint being in contact with the fingerprint imaging unit and the method of operation indicating an order in which the partial regions are at least either to be tapped or slid with respect to the fingerprint imaging unit in accordance with an order of presentation by extraction of the feature amounts match the feature amounts of the partial regions of the entire fingerprint and the method of operation registered in advance.

<17> The information processing apparatus according to <16>, in which the feature amounts of the partial regions selected by a user are registered in association with an operation method indicating which partial region of the entire fingerprint is to be slid through which route, the selected partial regions being selected from the presented partial regions from which more than a predetermined number of feature amounts are extracted, among the feature amounts extracted from the fingerprint image captured by the fingerprint imaging unit when the feature amounts of the partial regions of the entire fingerprint registered in advance are brought into contact with the fingerprint imaging unit and slid.

<18> The information processing apparatus according to <17>, further including:

a feature amount extraction unit that extracts at least either minutiae or fingerprint patterns as the feature amounts from the fingerprint image.

<19> The information processing apparatus according to <18>, in which as for the feature amounts of the partial regions of the entire fingerprint registered in advance, in a case where the minutiae fail to be extracted from the feature amount extraction unit as the feature amounts in the partial regions, the fingerprint patterns are registered as the feature amounts in the partial regions.

<20> In information processing method including the step of:

performing collation on the basis of whether or not feature amounts of partial regions of an entire fingerprint and a method of presenting the fingerprint in the partial regions of the entire fingerprint match the feature amounts of the partial regions of the entire fingerprint and the method of presentation registered in advance.

REFERENCE SIGNS LIST

11 Smartphone
21 Display unit
22, 23 Fingerprint imaging unit
31 Control unit
22 Input unit
33 Output unit
34 Storage unit
25 Storage unit
36 Drive
37 Removable storage medium
51 Registration processing unit
52 Feature amount extraction unit
53 Collation processing unit
101 Smartwatch
121 Display unit
122, 123 Fingerprint imaging unit

The invention claimed is:

1. An information processing apparatus comprising:
a registration unit that registers feature amounts of partial regions of an entire fingerprint used at time of collation in association with a method of presenting the fingerprint in the partial regions of the entire fingerprint at the time of collation,
wherein, for each of the partial regions, the registration unit individually registers feature amounts of a corresponding partial region in association with the method of presenting the feature amounts of the corresponding partial region, and
wherein the registration unit is implemented via at least one processor.

2. The information processing apparatus according to claim 1, further comprising:
a fingerprint imaging unit that captures a fingerprint image that is an image of the fingerprint,
wherein the registration unit registers the feature amounts extracted from the partial regions of the entire fingerprint image used at the time of collation in association with a method of operation on the fingerprint imaging unit in accordance with the presentation method in which presentation is performed by extraction of the feature amounts at the time of collation, and wherein the fingerprint imaging unit is implemented via at least one processor.

3. The information processing apparatus according to claim 2, wherein
the registration unit registers the feature amounts extracted from the partial regions of the entire fingerprint image used at the time of collation in association with a method of operation on the fingerprint imaging unit in accordance with an order of presentation by extraction of the feature amounts.

4. The information processing apparatus according to claim 2, wherein
the registration unit registers the feature amounts extracted from the partial regions of the entire fingerprint image used at the time of collation in association with a method of operation on the fingerprint imaging unit in accordance with an order of presentation by extraction of the feature amounts and a way of touching.

5. The information processing apparatus according to claim 2, wherein
the registration unit registers the feature amounts extracted from the fingerprint image captured by the fingerprint imaging unit when the partial regions of the entire fingerprint are brought into contact with the fingerprint imaging unit at the time of collation in association with an operation method indicating an order in which the partial regions of the entire fingerprint are to be brought into contact with the fingerprint imaging unit in accordance with an order of presentation by extraction of the feature amounts.

6. The information processing apparatus according to claim 2, wherein
the registration unit registers the feature amounts extracted from the fingerprint image captured by the fingerprint imaging unit when the partial regions of the entire fingerprint are brought into contact with the fingerprint imaging unit and at least either tapped or slid at the time of collation in association with at least either an operation method indicating an order in which the partial regions of the entire fingerprint are to be tapped against the fingerprint imaging unit in accordance with an order of presentation by extraction of the feature amounts or an operation method indicating a route of sliding.

7. The information processing apparatus according to claim 6, wherein
the registration unit registers the feature amounts of the partial regions selected by a user in association with an operation method indicating which partial region of the entire fingerprint is to be slid through which route, the selected partial regions being selected from the presented partial regions from which more than a predetermined number of feature amounts are extracted, among the feature amounts extracted from the fingerprint image captured by the fingerprint imaging unit when the partial regions of the entire fingerprint are brought into contact with the fingerprint imaging unit and slid at the time of collation.

8. The information processing apparatus according to claim 2, further comprising:
a feature amount extraction unit that extracts at least either minutiae or fingerprint patterns as the feature amounts from the fingerprint image,
wherein the feature amount extraction unit is implemented via at least one processor.

9. The information processing apparatus according to claim 8, wherein the registration unit registers the fingerprint patterns as the feature amounts in the partial regions in a case where the minutiae fail to be extracted from the feature amount extraction unit.

10. An information processing method comprising:
registering feature amounts of partial regions of an entire fingerprint used at time of collation in association with a method of presenting the fingerprint in the partial regions of the entire fingerprint at the time of collation,
wherein the registering of the feature amounts includes, for each of the partial regions, individually registering feature amounts of a corresponding partial region in association with the method of presenting the feature amounts of the corresponding partial region.

11. An information processing apparatus comprising:
a collation unit that performs collation on a basis of whether or not feature amounts of partial regions of an entire fingerprint and a method of presenting the fingerprint in the partial regions of the entire fingerprint match the feature amounts of the partial regions of the entire fingerprint and the method of presentation registered in advance,
wherein, for each of the partial regions, feature amounts of a corresponding partial region are individually registered in association with the method of presenting the feature amounts of the corresponding partial region, and
wherein the collation unit is implemented via at least one processor.

12. The information processing apparatus according to claim 11, further comprising:
a fingerprint imaging unit that captures a fingerprint image that is an image of the fingerprint,
wherein the collation unit performs collation on a basis of whether or not the feature amounts extracted from the partial regions of the entire fingerprint image and a method of operation on the fingerprint imaging unit in accordance with a presentation method in which presentation is performed by extraction of the feature amounts match the feature amounts of the partial regions of the entire fingerprint and the method of operation registered in advance, and
wherein the fingerprint imaging unit is implemented via at least one processor.

13. The information processing apparatus according to claim 12, wherein
the collation unit performs collation on a basis of whether or not the feature amounts extracted from the partial regions of the entire fingerprint image and the method of operation on the fingerprint imaging unit in accordance with an order presented by extraction of the feature amounts match the feature amounts of the partial regions of the entire fingerprint and the method of operation registered in advance.

14. The information processing apparatus according to claim 12, wherein
the collation unit performs collation on a basis of whether or not the feature amounts extracted from the partial regions of the entire fingerprint image and the method of operation on the fingerprint imaging unit in accordance with an order of presentation by extraction of the feature amounts and a way of touching match the feature amounts of the partial regions of the entire fingerprint and the method of operation registered in advance.

15. The information processing apparatus according to claim 12, wherein
the collation unit performs collation on a basis of whether or not the feature amounts extracted from the fingerprint image captured by the fingerprint imaging unit when the partial regions of the entire fingerprint are brought into contact with the fingerprint imaging unit and the method of operation indicating an order in which the partial regions of the entire fingerprint are to be brought into contact with the fingerprint imaging unit in accordance with an order of presentation by extraction of the feature amounts match the feature amounts of the partial regions of the entire fingerprint and the method of operation registered in advance.

16. The information processing apparatus according to claim 12, wherein
the collation unit performs collation on a basis of whether or not the feature amounts extracted from the fingerprint image captured by the fingerprint imaging unit when at least either tapping or sliding is performed with the partial regions of the entire fingerprint being in contact with the fingerprint imaging unit and the method of operation indicating an order in which the partial regions are at least either to be tapped or slid with respect to the fingerprint imaging unit in accordance with an order of presentation by extraction of the feature amounts match the feature amounts of the partial regions of the entire fingerprint and the method of operation registered in advance.

17. The information processing apparatus according to claim 16, wherein
the feature amounts of the partial regions selected by a user are registered in association with an operation method indicating which partial region of the entire fingerprint is to be slid through which route, the selected partial regions being selected from the presented partial regions from which more than a predetermined number of feature amounts are extracted, among the feature amounts extracted from the fingerprint image captured by the fingerprint imaging unit when the feature amounts of the partial regions of the entire fingerprint registered in advance are brought into contact with the fingerprint imaging unit and slid.

18. The information processing apparatus according to claim 17, further comprising:
a feature amount extraction unit that extracts at least either minutiae or fingerprint patterns as the feature amounts from the fingerprint image,
wherein the feature amount extraction unit is implemented via at least one processor.

19. The information processing apparatus according to claim 18, wherein
as for the feature amounts of the partial regions of the entire fingerprint registered in advance, in a case where the minutiae fail to be extracted from the feature amount extraction unit as the feature amounts in the partial regions, the fingerprint patterns are registered as the feature amounts in the partial regions.

20. An information processing method comprising:
performing collation on a basis of whether or not feature amounts of partial regions of an entire fingerprint and a method of presenting the fingerprint in the partial regions of the entire fingerprint match the feature amounts of the partial regions of the entire fingerprint and the method of presentation registered in advance,
wherein, for each of the partial regions, feature amounts of a corresponding partial region are individually registered in association with the method of presenting the feature amounts of the corresponding partial region.

* * * * *